(12) United States Patent
Tian et al.

(10) Patent No.: US 12,306,519 B2
(45) Date of Patent: May 20, 2025

(54) LASER SOURCE AND LASER PROJECTION APPARATUS

(71) Applicant: Hisense Laser Display Co., Ltd, Qingdao (CN)

(72) Inventors: Xintuan Tian, Qingdao (CN); Boyu Zhou, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 858 days.

(21) Appl. No.: 17/481,800

(22) Filed: Sep. 22, 2021

(65) Prior Publication Data

US 2022/0004090 A1 Jan. 6, 2022

Related U.S. Application Data

(63) Continuation-in-part of application No. PCT/CN2020/121935, filed on Oct. 19, 2020, and a
(Continued)

(30) Foreign Application Priority Data

Oct. 25, 2019 (CN) .......................... 201911024312.5
Oct. 25, 2019 (CN) .......................... 201911024401.X
Oct. 25, 2019 (CN) .......................... 201911025064.6

(51) Int. Cl.
*G03B 21/20* (2006.01)
*G03B 33/12* (2006.01)

(52) U.S. Cl.
CPC ..... *G03B 21/2033* (2013.01); *G03B 21/2066* (2013.01); *G03B 21/208* (2013.01); *G03B 33/12* (2013.01)

(58) Field of Classification Search
CPC ............ G03B 21/2033; G03B 21/2066; G03B 21/208; G03B 33/12; G03B 21/2073; G03B 21/16; G03B 21/2013
(Continued)

(56) References Cited

U.S. PATENT DOCUMENTS

2010/0277698 A1 11/2010 Harland et al.
2013/0335710 A1* 12/2013 Okamoto ............... G03B 33/12
353/30
(Continued)

FOREIGN PATENT DOCUMENTS

CN 102414583 A 4/2012
CN 102566235 A 7/2012
(Continued)

OTHER PUBLICATIONS

International Search Report and Written Opinion issued in corresponding International Application No. PCT/CN2020/121934 dated Jan. 25, 2021, with English translation.
(Continued)

*Primary Examiner* — Magda Cruz
(74) *Attorney, Agent, or Firm* — Morgan, Lewis & Bockius LLP

(57) ABSTRACT

A laser source includes a laser source housing, a laser array and a beam path assembly. The laser source housing includes an accommodating opening and a beam outlet. The laser array is disposed in the accommodating opening. The laser array is configured to emit laser beams into the laser source housing. A laser-exit surface of the laser array includes a plurality of laser-exit regions. The plurality of laser-exit regions are configured to emit laser beams of
(Continued)

multiple colors. The beam path assembly is disposed inside the laser source housing. The beam path assembly is configured to combine the laser beams of the multiple colors emitted by the laser array, and make the combined laser beams exit toward the beam outlet.

20 Claims, 15 Drawing Sheets

Related U.S. Application Data continuation-in-part of application No. PCT/CN2020/121936, filed on Oct. 19, 2020, and a continuation-in-part of application No. PCT/CN2020/121934, filed on Oct. 19, 2020.

(58) Field of Classification Search
USPC .......................................................... 353/30
See application file for complete search history.

(56) References Cited

U.S. PATENT DOCUMENTS

| | | | |
|---|---|---|---|
| 2014/0118703 A1 | 5/2014 | Chang et al. | |
| 2014/0247431 A1 | 9/2014 | Boss | |
| 2016/0366384 A1 | 12/2016 | Miyata et al. | |
| 2017/0111621 A1* | 4/2017 | Tian | H04N 9/3155 |
| 2018/0101017 A1 | 4/2018 | Tajiri | |
| 2018/0120680 A1 | 5/2018 | Mori | |
| 2019/0285977 A1* | 9/2019 | Tian | G03B 21/2013 |
| 2019/0324356 A1 | 10/2019 | Chen et al. | |
| 2024/0380869 A1* | 11/2024 | Xiao | G09G 3/34 |

FOREIGN PATENT DOCUMENTS

| | | | | |
|---|---|---|---|---|
| CN | 102591120 A | | 7/2012 | |
| CN | 103792769 A | | 5/2014 | |
| CN | 103901624 A | | 7/2014 | |
| CN | 104421747 A | | 3/2015 | |
| CN | 105259732 A | | 1/2016 | |
| CN | 105404086 A | * | 3/2016 | ............ G03B 21/00 |
| CN | 105573035 A | | 5/2016 | |
| CN | 205485254 U | | 8/2016 | |
| CN | 106249528 A | | 12/2016 | |
| CN | 106873298 A | | 6/2017 | |
| CN | 207689821 U | | 8/2018 | |
| CN | 208506475 U | | 2/2019 | |
| CN | 210954574 U | | 7/2020 | |
| CN | 210954575 U | | 7/2020 | |
| CN | 210954576 U | | 7/2020 | |

OTHER PUBLICATIONS

International Search Report and Written Opinion issued in corresponding International Application No. PCT/CN2020/121935 dated Jan. 19, 2021, with English translation.

International Search Report and Written Opinion issued in corresponding International Application No. PCT/CN2020/121936 dated Jan. 19, 2021, with English translation.

* cited by examiner

LASER SOURCE AND LASER PROJECTION APPARATUS

CROSS-REFERENCE TO RELATED APPLICATIONS

This application is a continuation-in-part of International Application No. PCT/CN2020/121934, with an international filing date of 19 Oct. 2020, which claims the priority to Chinese Patent Application No. 201911025064.6, filed 25 Oct. 2019; and this application is a continuation-in-part of International Application No. PCT/CN2020/121935, with an international filing date of 19 Oct. 2020, which claims the priority to Chinese Patent Application No. 201911024312.5, filed 25 Oct. 2019; and this application is a continuation-in-part of International Application No. PCT/CN2020/121936, with an international filing date of 19 Oct. 2020, which claims the priority to Chinese Patent Application No. 201911024401.X, filed 25 Oct. 2019. The entire contents of the foregoing applications are hereby incorporated by reference herein.

TECHNICAL FIELD

The present disclosure relates to the field of laser projection technologies, and in particular, to a laser source and a laser projection apparatus.

BACKGROUND

A laser source has advantages of good monochromaticity, high luminance, and long service life. Therefore, the laser source is an ideal light source, and is widely used in laser projection apparatuses such as laser televisions and laser projectors. The laser source is an important component of laser projection apparatuses such as laser televisions and laser projectors, and is used to provide illumination beams.

SUMMARY

In an aspect, a laser source is provided. The laser source includes a laser source housing, a laser array and a beam path assembly. The laser source housing includes an accommodating opening and a beam outlet. The laser array is disposed in the accommodating opening. The laser array is configured to emit laser beams into the laser source housing. A laser-exit surface of the laser array includes a plurality of laser-exit regions. The plurality of laser-exit regions are configured to emit laser beams of multiple colors. The beam path assembly is disposed inside the laser source housing. The beam path assembly is configured to combine the laser beams of the multiple colors emitted by the laser array, and make the combined laser beams exit toward the beam outlet.

In another aspect, a laser projection apparatus is provided. The laser projection apparatus includes a laser source, an optical engine and a projection lens. The laser source is configured to provide illumination beams, and the laser source is the above laser source. The optical engine is configured to modulate the illumination beams with image display signals to obtain projection beams. The projection lens is configured to project the projection beams on a screen or a wall for imaging.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals to which the embodiments of the present disclosure relate.

DETAILED DESCRIPTION

Figure 1:
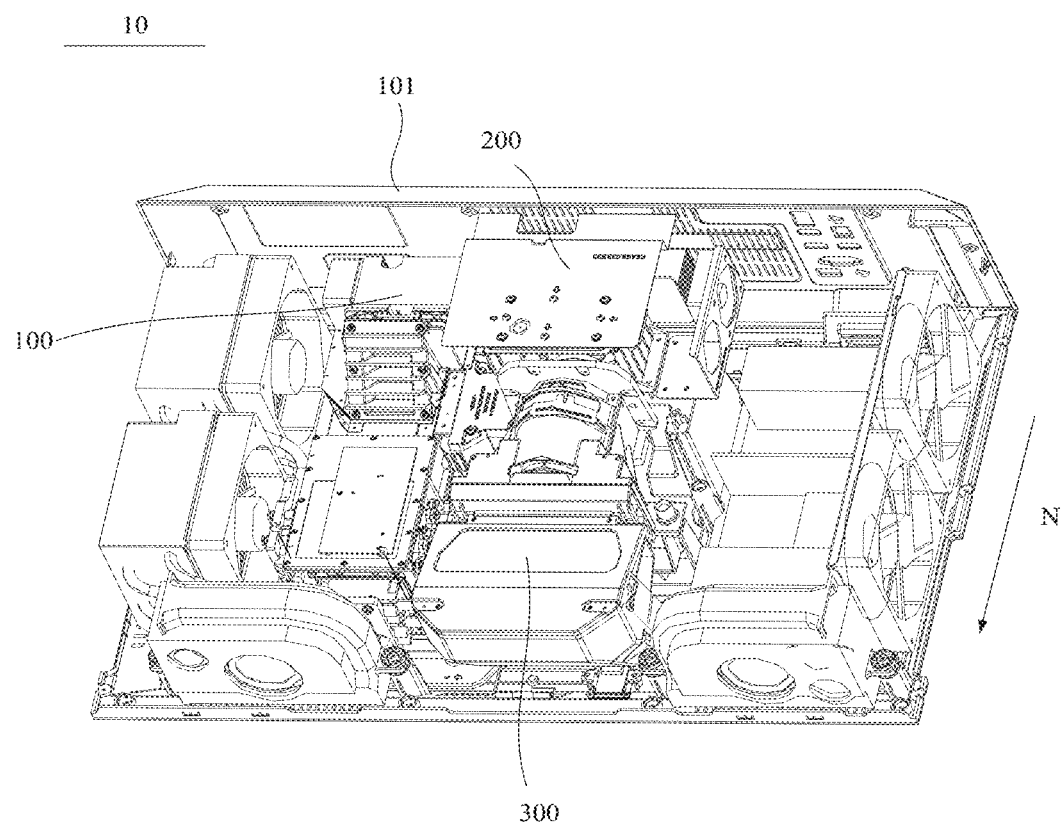
FIG. 1 is a diagram showing a structure of a laser projection apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to".

In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a plurality of" means two or more unless otherwise specified.

In the description of some embodiments, the terms "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [stated condition or event]", depending on the context.

The use of the phrase "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "about", "substantially" or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

Terms such as "parallel", "perpendicular", or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., limitations of a measurement system). For example, the term "parallel" includes absolute parallel and approximate parallel, and the acceptable deviation range for the approximate parallel may be, for example, a deviation within 5°. The term "perpendicular" includes absolute vertical and approximate vertical, and the acceptable deviation range of the approximate vertical may also be, for example, a deviation within 5°. The term "equal" includes absolute equality and approximate equality, and the acceptable deviation range of the approximate equality may be that, for example, a difference between the two that are equal is less than or equal to 5% of either of the two.

Some embodiments of the present disclosure provide a laser projection apparatus. As shown in FIG. 1, the laser projection apparatus 10 includes a housing 101 (only part of the housing 101 is shown in FIG. 1), and a laser source 100, an optical engine 200, and a projection lens 300 that are assembled in the housing 101. The laser source 100 is configured to provide illumination beams (laser beams). The optical engine 200 is configured to modulate the illumination beams provided by the laser source 100 with image display signals to obtain projection beams. The projection lens 300 is configured to project the projection beams on a screen or a wall for imaging. In some embodiments, the laser projection apparatus 10 further includes a screen. The screen is disposed in a laser-exit path of the projection lens 300, and the projection beams emitted by the projection lens 300 form an image on the screen.

The laser source 100, the optical engine 200, and the projection lens 300 are sequentially connected in a propagation direction of the beams, and are each wrapped by a corresponding housing. The housings of the laser source 100, the optical engine 200 and the projection lens 300 support their corresponding optical components respectively and make the optical components meet certain sealing or airtight requirements. For example, the laser source 100 is hermetically sealed through its corresponding housing, which may well solve a light attenuation problem of the laser source 100.

Figure 2:
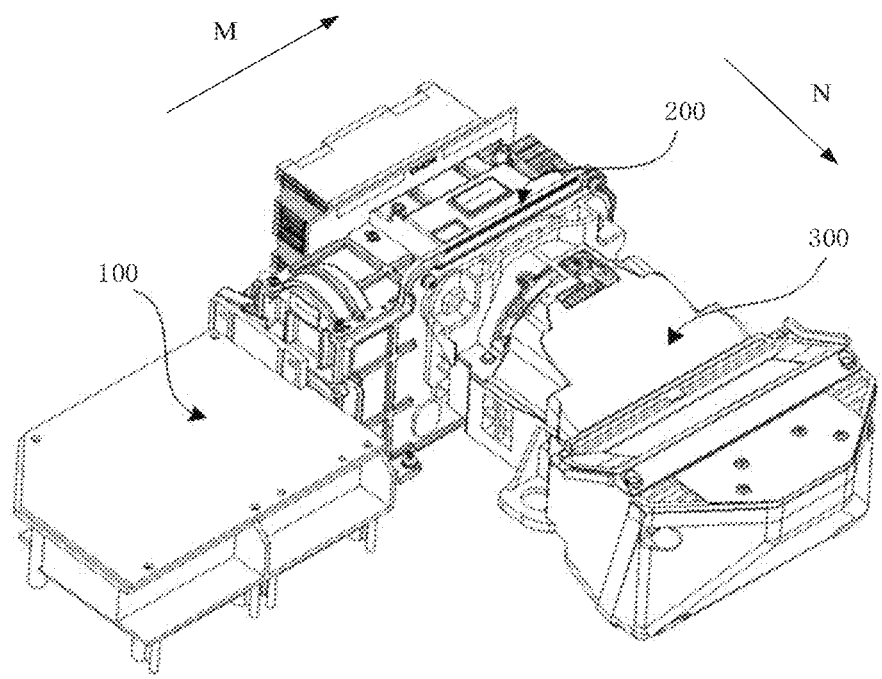
FIG. 2 is a diagram showing a structure of a laser source, an optical engine, and a projection lens in a laser projection apparatus, in accordance with some embodiments.

One end of the optical engine 200 is connected to the projection lens 300, and the optical engine 200 and the projection lens 300 are arranged in a direction of the projection beams of the laser projection apparatus 10 (refer to the N direction shown in FIG. 2). The other end of the optical engine 200 is connected to the laser source 100. In the example, as shown in FIG. 2, the laser source 100, the optical engine 200, and the projection lens 300 are connected in an "L" shape. That is, the direction of the projection beams of the laser projection apparatus 10 (refer to the N direction shown in FIG. 2) is substantially perpendicular to a direction of the illumination beams of the laser projection apparatus 10 (refer to the M direction shown in FIG. 2). On one hand, such connection structure may adapt to characteristics of a beam path of a reflective light valve in the optical engine 200, and on another hand, it is also conducive to shortening a length of a beam path in a one-dimensional direction, which is helpful for structural arrangement of the laser projection apparatus 10. For example, in a case where the laser source 100, the optical engine 200, and the projection lens 300 are disposed in the one-dimension direction (e.g., the M direction), a length of a beam path in the direction is long, which is not conducive to the structural arrangement of the laser projection apparatus 10.

Figure 3:
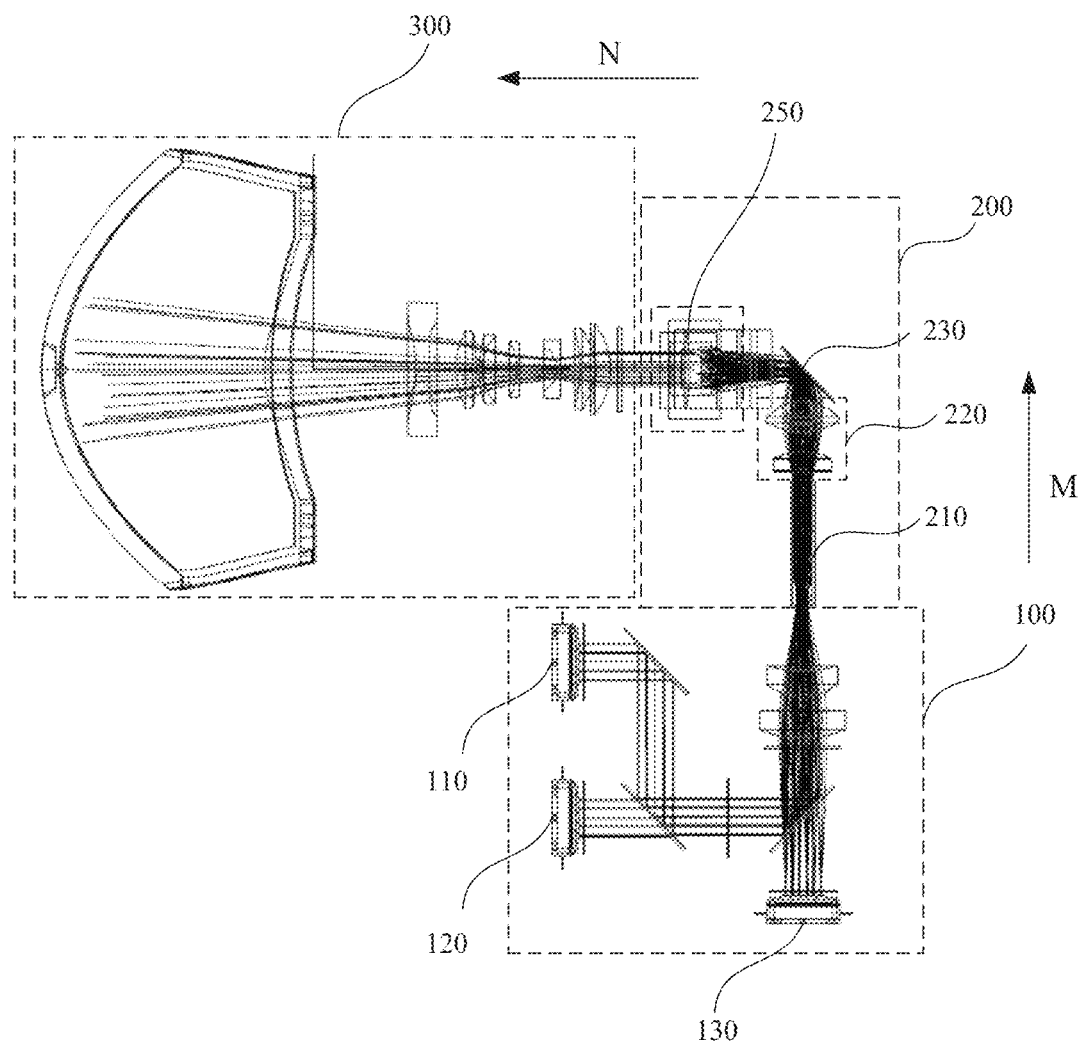
FIG. 3 is a diagram showing a simplified structure of a laser source, an optical engine, and a projection lens in a laser projection apparatus, in accordance with some embodiments.

In some embodiments, referring to FIG. 3, the laser source 100 may include three laser arrays. The three laser arrays may be a red laser array 130, a green laser array 120, and a blue laser array 110 respectively. That is, the laser source 100 is a tri-color laser source, but is not limited thereto. The three laser arrays may also all be blue laser arrays 110, or two blue laser arrays 110 and one red laser array 130.

In some embodiments, the laser source 100 may further include two laser arrays or one laser array (i.e., a mono-color laser source). The two laser arrays may be the blue laser array 110 and the red laser array 130, that is, the laser source 100 is a dual-color laser source. The two laser arrays may also both be blue laser arrays 110. In the mono-color laser source, the one laser array may be the blue laser array 110.

Figure 4:
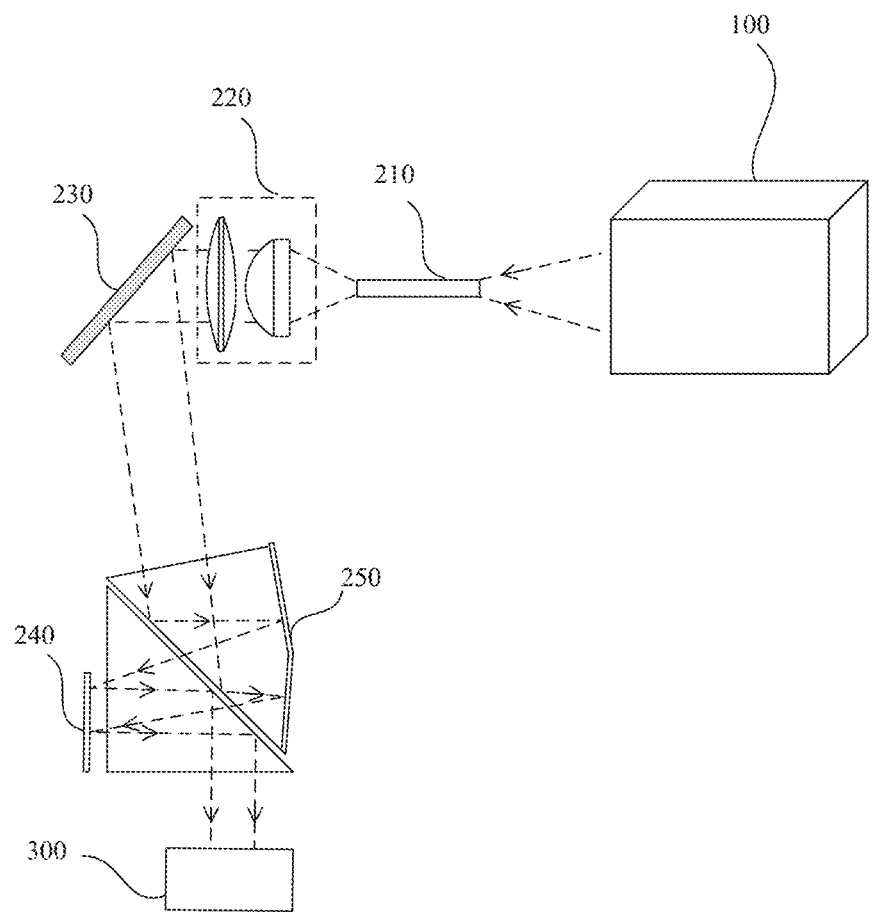
FIG. 4 is a schematic diagram showing a structure of a beam path in a laser projection apparatus, in accordance with some embodiments.

The illumination beams emitted by the laser source 100 enter the optical engine 200. Referring to FIGS. 3 and 4, the optical engine 200 may include a light pipe 210, a lens assembly 220, a reflector 230, a digital micromirror device (DMD) 240 and a prism assembly 250. The light pipe 210 may receive the illumination beams provided by the laser source 100 and homogenize the illumination beams. The lens assembly 220 may first collimate the illumination beams homogenized by the light pipe 210, and then converge the collimated illumination beams and emit the converged illumination beams to the reflector 230. The reflector 230 may reflect the illumination beams that are first collimated and then converged by the lens assembly 220 to the prism assembly 250. The prism assembly 250 reflects the illumination beams reflected by the reflector 230 to the DMD 240. The DMD 240 modulates the illumination beams to obtain the projection beams, and reflects the projection beams obtained by modulating the illumination beams into the projection lens 300.

In the optical engine 200, the DMD 240 is a core component, which plays a role of modulating the illumination beams provided by the laser source 100 through the image display signals. That is, the DMD 240 controls the projection beams to display different colors and luminance according to different pixels of an image to be displayed, so as to finally form an optical image. Therefore, the DMD 240 is also referred to as an optical modulator or a light valve. Depending on whether the optical modulator (or the light valve) transmits or reflects the illumination beams, the optical modulator (or the light valve) may be classified as a transmissive optical modulator (or light valve) or a reflective optical modulator (or light valve). For example, the DMD 240 shown in FIG. 4 reflects the illumination beams, and thus it is a reflective optical modulator. A liquid crystal light valve transmits the illumination beams, and thus it is a transmissive optical modulator. In addition, according to the number of the optical modulators (or the light valves) used in the optical engine, the optical engine may be classified as a single-chip system, a double-chip system, or a three-chip system. For example, only one DMD 240 is used in the optical engine 200 shown in FIG. 4, and thus the optical engine 200 may be referred to as a single-chip system. In a case where three digital micromirror devices are used, the optical engine 200 may be referred to as a three-chip system.

Figure 5:
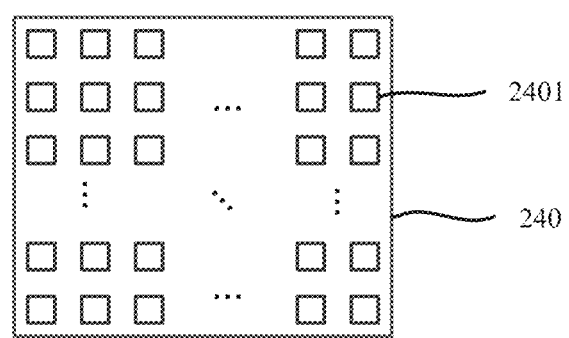
FIG. 5 is a diagram showing an arrangement of micromirrors in a digital micromirror device, in accordance with some embodiments.
Figure 6:
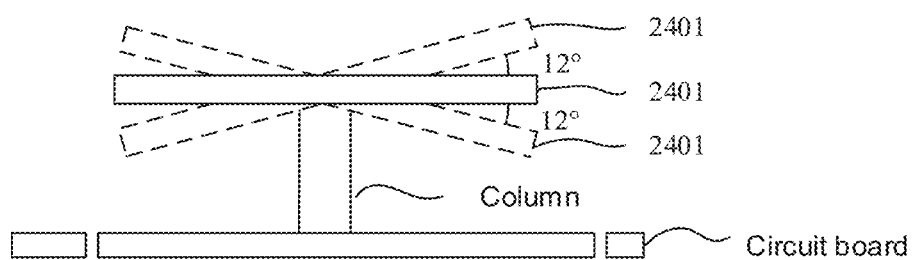
FIG. 6 is a schematic diagram showing a swing position of a micromirror in the digital micromirror device shown in FIG. 5.

The digital micromirror device 240 is applied to a digital light processing (DLP) projection architecture. The optical engine 200 shown in FIG. 4 uses the DLP projection architecture. As shown in FIG. 5, the digital micromirror device 240 includes thousands of micromirrors 2401 that may be individually driven to rotate. These micromirrors 2401 are arranged in an array, and each micromirror 2401 corresponds to one pixel in the image to be displayed. As shown in FIG. 6, in the DLP projection architecture, each micromirror 2401 is equivalent to a digital switch. The micromirror may swing by a range of plus or minus 12 degrees (i.e., ±12°) or a range of plus or minus 17 degrees (i.e., ±17°) due to action of an external force.

Figure 7:
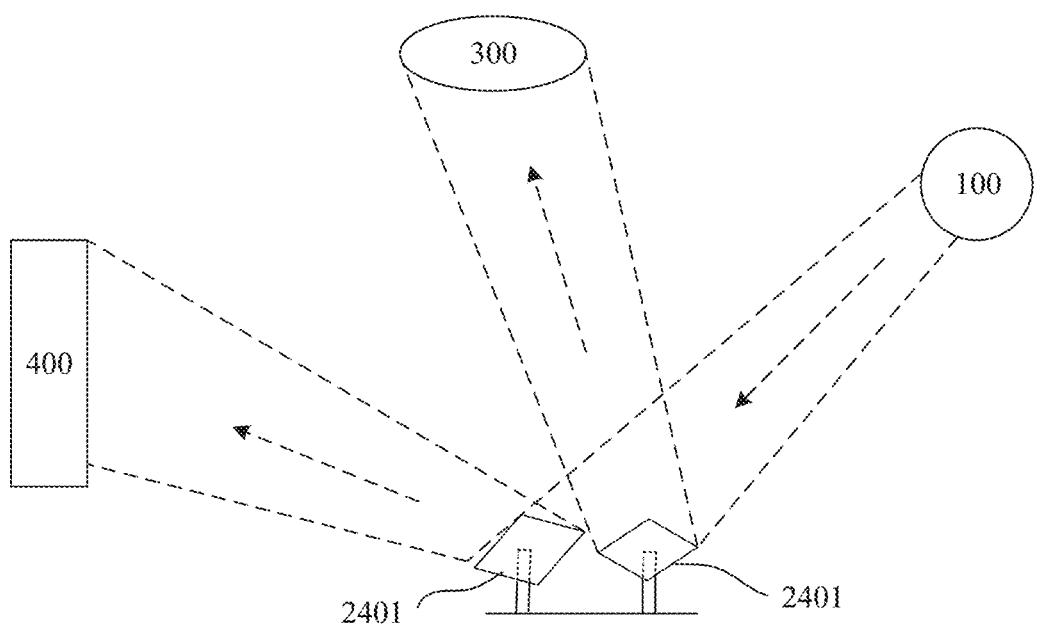
FIG. 7 is a schematic diagram showing operation of micromirrors, in accordance with some embodiments.

As shown in FIG. 7, a laser beam reflected by the micromirror 2401 at a negative deflection angle is referred to as an OFF laser beam, and the OFF laser beam is an ineffective laser beam, and which is usually irradiated on the housing 101 of the laser projection apparatus 10 and the housing of the optical engine 200, or is absorbed by a laser absorption unit 400. A laser beam reflected by the micromirror 2401 at a positive deflection angle is referred to as an ON laser beam. The ON laser beam is an effective beam that enters the projection lens 300 at a positive deflection angle after the micromirror 2401 on a surface of the DMD 240 receives irradiation of the illumination beams, and is used to project an image. An ON state of the micromirror 2401 is a state that the micromirror 2401 is in and may be maintained when the illumination beams emitted by the laser source 100 may enter the projection lens 300 after being reflected by the micromirror 2401. That is, the micromirror 2401 is in a state of a positive deflection angle. An OFF state of the micromirror 2401 is a state that the micromirror 2401 is in and may be maintained when the illumination beams emitted by the laser source 100 does not enter the projection lens 300 after being reflected by the micromirror 2401. That is, the micromirror 2401 is in a state of a negative deflection angle.

For example, for a micromirror 2401 with a deflection angle of ±12°, a state at +12° is the ON state, and a state at −12° is the OFF state. For a deflection angle between −12° and +12°, it is not used in practice, and actual operation states of the micromirror 2401 are only the ON state and the OFF state. For a micromirror 2401 with a deflection angle of ±17°, a state at +17° is the ON state, and a state at −17° is the OFF state. The image display signals are converted into digital codes such as 0 or 1 after being processed, and these digital codes may drive the micromirrors 2401 to swing.

In a display cycle of a frame image, part or all of the micromirrors 2401 are switched once between the ON state and the OFF state, so that gray scales of pixels in the frame image are achieved according to durations of the micromirrors 2401 in the ON state and the OFF state. For example, in a case where the pixels have 256 gray scales from 0 to 255, micromirrors corresponding to a gray scale 0 are each in the OFF state in an entire display cycle of the frame image, micromirrors corresponding to a gray scale 255 are each in the ON state in the entire display cycle of the frame image, and micromirrors corresponding to a gray scale 127 are each in the ON state for a half of time and in the OFF state for the other half of time in the display cycle of the frame image. Therefore, by controlling a state that each micromirror in the DMD 240 is in and a duration of each state in the display cycle of the frame image through the image display signals, luminance (the gray scale) of a pixel corresponding to the micromirror 2401 may be controlled, and a purpose of modulating the illumination beams projected onto the DMD 240 may be achieved.

Referring to FIGS. 3 and 4, the light pipe 210, the lens assembly 220 and the reflector 230 in front of the DMD 240 form an illumination path. After passing through the illumination path, the illumination beams emitted by the laser source 100 are made to conform to a beam size and an incident angle required by the DMD 240.

As shown in FIG. 3, the projection lens 300 includes a combination of a plurality of lenses, which are usually divided by group, and are divided into a three-segment combination including a front group, a middle group and a rear group, or a two-segment combination including a front group and a rear group. The front group is a lens group proximate to a laser-exit side of the laser projection apparatus (a left side shown in FIG. 3), and the rear group is a lens group proximate to a laser-exit side of the optical engine 200 (a right side shown in FIG. 3). The projection lens 300 may be a zoom projection lens, or a prime adjustable-focus projection lens, or a prime projection lens. In some embodiments, the laser projection apparatus is an ultra-short-focus projection apparatus. The projection lens 300 is an ultra-short-focus projection lens, and a projection ratio of the projection lens 300 is usually less than 0.3, such as 0.24.

The laser source 100 according to some embodiments of the present disclosure will be described in detail below.

Figure 8:
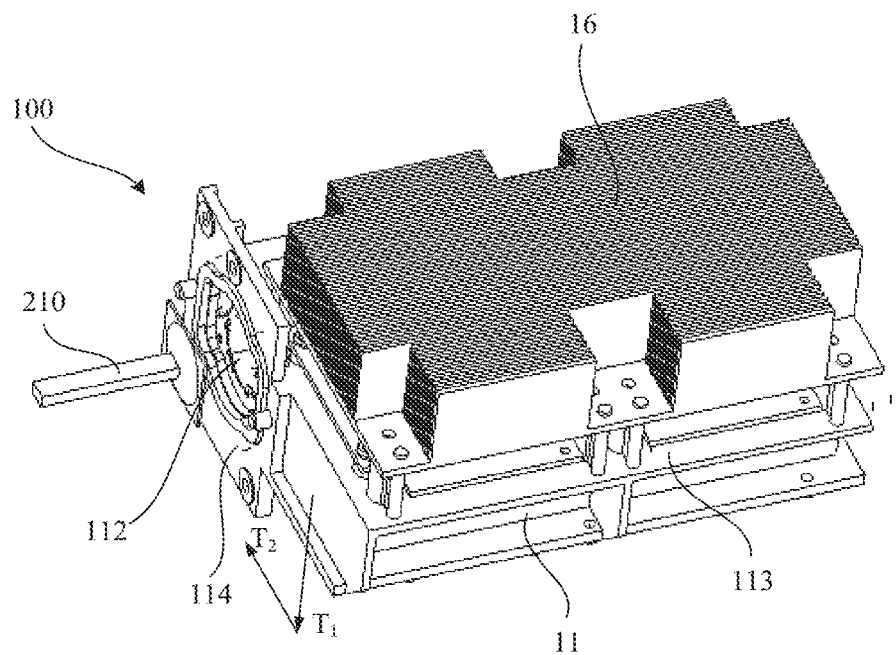
FIG. 8 is a perspective view of a laser source, in accordance with some embodiments.
Figure 9:
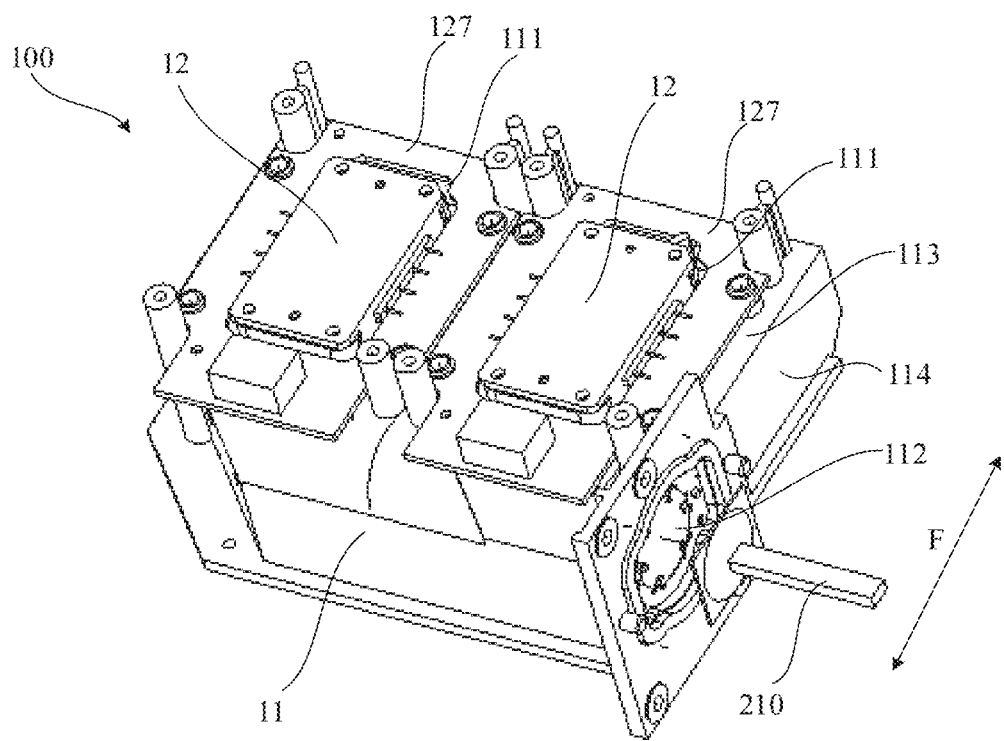
FIG. 9 is a perspective view of the laser source in FIG. 8 with a radiator removed.
Figure 10:
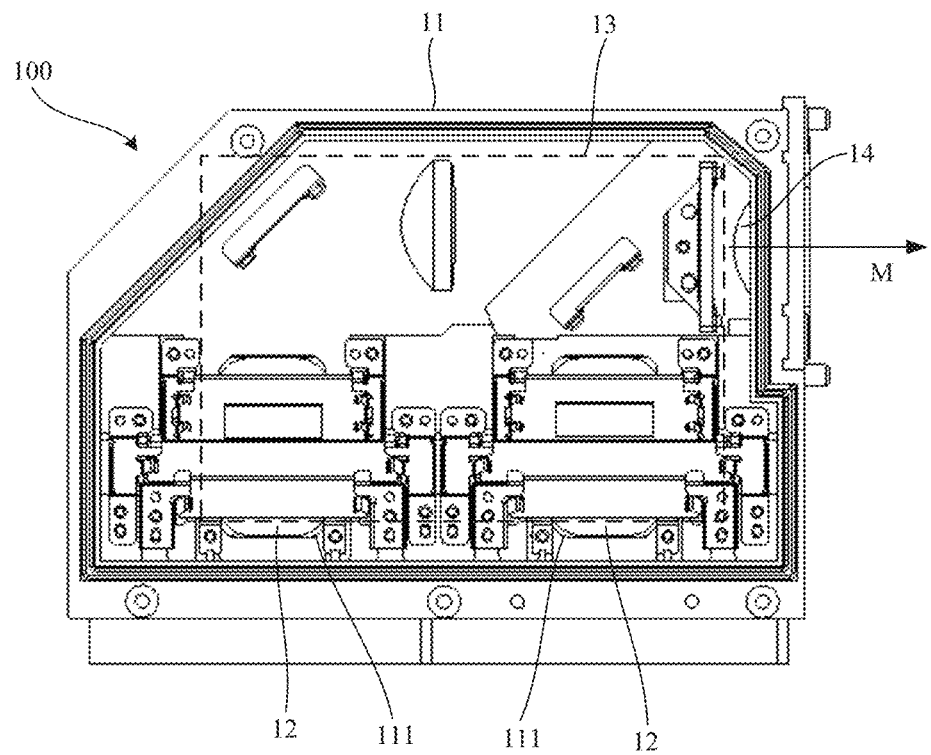
FIG. 10 is a diagram showing an internal structure of a laser source, in accordance with some embodiments.
Figure 11:
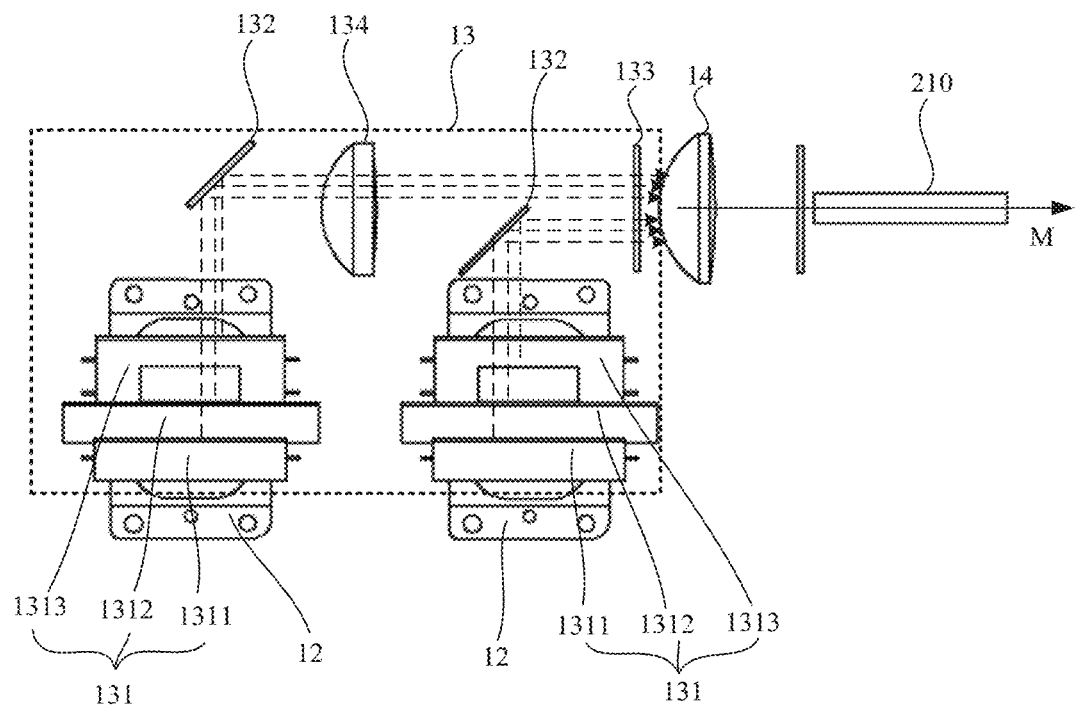
FIG. 11 is a diagram showing a beam path of a laser source, in accordance with some embodiments.

In some embodiments, as shown in FIGS. 8 and 9, the laser source 100 includes a laser source housing 11, two laser arrays 12 and a beam path assembly 13 (refer to FIGS. 10 and 11).

The laser source housing 11 includes a first side wall 113 and a second side wall 114 perpendicular to each other. The first side wall 113 includes two accommodating openings 111, and the second side wall 114 includes a beam outlet 112. The two accommodating openings 111 penetrate the first side wall 113, and the beam outlet 112 penetrates the second side wall 114. In some embodiments, a direction of the two accommodating openings 111 penetrating the first side wall 113 is substantially perpendicular to a direction of the beam outlet 112 penetrating the second side wall 114.

The two laser arrays 12 are respectively installed in the two accommodating openings 111, and each laser array 12 emits laser beams into the laser source housing 11. It can be understood that, arrangement positions of the plurality of accommodating openings 111 on side walls of the laser source housing 11 determine arrangement positions of the plurality of laser arrays 12. The present disclosure does not limit the arrangement positions of the plurality of accommodating openings 111 on the side walls.

In some embodiments, as shown in FIG. 9, the plurality of accommodating openings 111 are arranged in a direction perpendicular to the second side wall 114. For example, the plurality of accommodating openings 111 may be arranged substantially in a direction parallel to a center line of the beam outlet 112. A direction of the center line of the beam outlet 112 is substantially parallel to the direction M of the illumination beams. In this way, a dimension of the laser source 100 in a direction parallel to the second side wall 114 (i.e., the direction F in FIG. 9) is small. The direction parallel to the second side wall 114 is substantially parallel to the direction N of the projection beams.

It can be understood that, the larger the number of the laser arrays 12 is, the larger luminance of the laser source 100 is. The number of the laser arrays 12 may be one, two, three, four or more. The number of the laser arrays 12 may be determined according to luminance required by the laser source 100, which is not limited in the present disclosure. For convenience of description, some embodiments are mainly described by taking an example in which the laser source 100 includes two laser arrays 12, but this is not be understood as a limitation of the present disclosure.

Figure 12A:
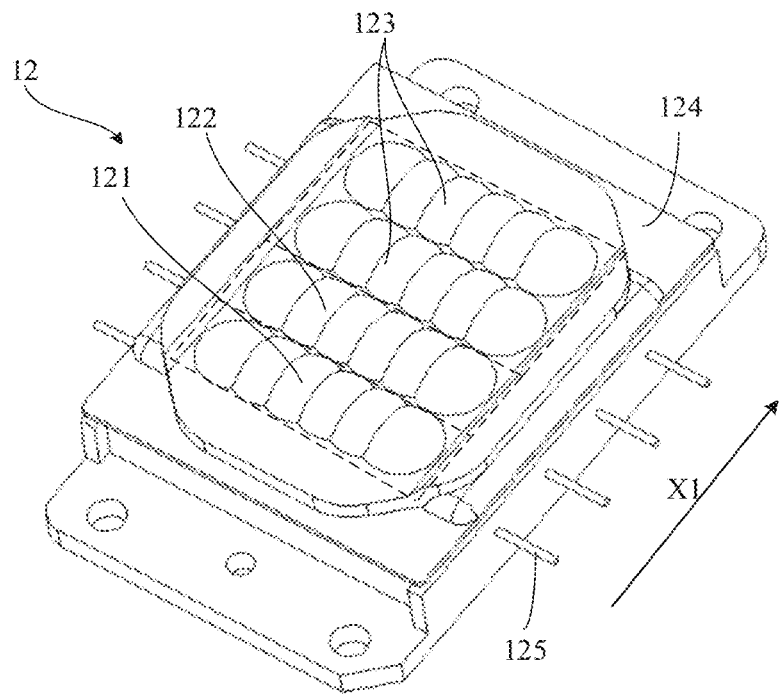
FIG. 12A is a diagram showing a structure of a laser array in a laser source, in accordance with some embodiments.

In some embodiments, the laser array 12 may be a multi-chip laser diode (MCL) assembly. The MCL assembly includes an MCL device and a driving circuit board disposed on a periphery of the MCL device. The MCL device encapsulates a plurality of lamp beads on a substrate to form an area laser source. As shown in FIG. 12A, the laser array 12 includes a metal substrate 124. A plurality of lamp beads are encapsulated on the metal substrate 124. The plurality of lamp beads may be connected in series for driving, or may be connected in parallel in rows or columns for driving. The plurality of lamp beads may be arranged in a 4×6 array, or may be arranged in other arrays, such as a 3×5 array, a 2×7 array, a 2×6 array, or a 4×5 array. Overall luminous power of lamp beads with different numbers of arrays is different. There are pins 125 protruding from two sides of the metal substrate 124. Each pin is coupled to an electrical signal to drive the lamp beads to emit laser beams.

Figure 12B:
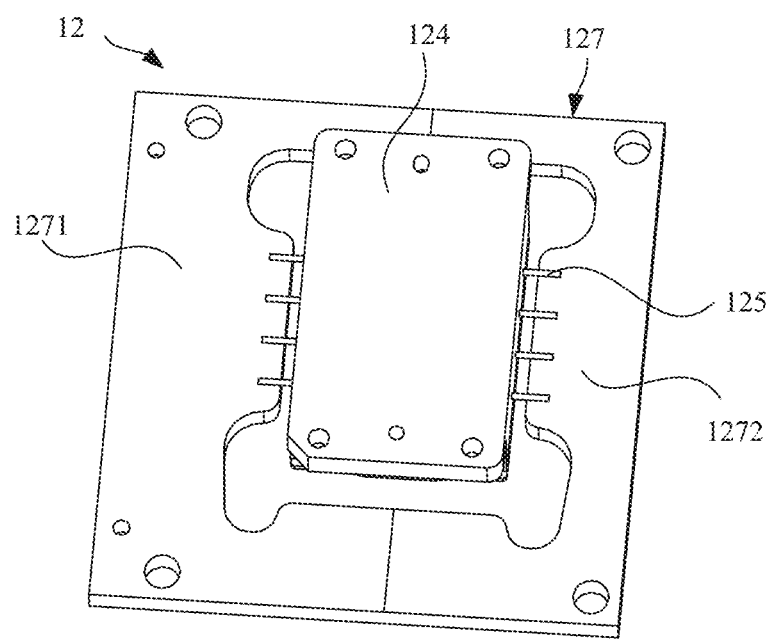
FIG. 12B is a diagram showing a circuit package structure of the laser array in FIG. 12A.

As shown in FIG. 12B, the laser array 12 further includes a driving circuit board 127 disposed on the periphery of the MCL device. FIG. 12B shows a back surface of the laser array 12 in FIG. 12A. The driving circuit board 127 has a flat-plate structure, and the driving circuit board 127 is substantially parallel to or in a same plane as a laser-exit surface of the MCL device. There is at least one pin 125 on each of two opposite sides of the MCL device. Each pin 125 is soldered onto or plugged into the driving circuit board 127, so that the MCL device is electrically connected to the driving circuit board 127. The driving circuit board 127 is configured to provide a driving signal to the MCL device.

In some embodiments, the driving circuit board is integrally formed and surrounds an outside of the metal substrate 124 of the MCL device. In some other embodiments, the driving circuit board includes two separate circuit boards. That is, the driving circuit board 127 includes a first portion 1271 and a second portion 1272, and the MCL device is enclosed by the two portions. In this way, the laser array 12 is also basically a flat-plate structure, which facilitates the installation, and saves space, and is also conducive to achieving miniaturization of the laser source apparatus.

The plurality of accommodating openings 111 are provided on a same side wall of the laser source housing 11, and the plurality of laser arrays 12 are respectively installed in the plurality of accommodating openings 111, so that the driving circuit boards 127 of the plurality of laser arrays 12 (as shown in FIG. 9) may be set to be coplanar. In this way, one radiator 16 may be used to cool the plurality of laser arrays 12 simultaneously (as shown in FIG. 8). Therefore, in a case where the laser source 100 includes the radiator 16, the cost of the laser source 100 can be reduced, the structural complexity of the laser source 100 can be reduced, and a volume of the laser source 100 can be reduced.

In some embodiments, as shown in FIG. 12A, a laser-exit surface of each laser array 12 includes a plurality of laser-exit regions. The plurality of laser-exit regions are configured to emit laser beams of multiple colors. Referring to FIGS. 10 and 11, the beam path assembly 13 is able to combine the laser beams of multiple colors emitted by the two laser arrays 12, and emit the combined laser beams toward the beam outlet 112.

The number of the plurality of laser-exit regions included in the laser-exit surface of a laser array 12 is equal to the number of colors of the laser beams emitted by the laser-exit surface of the laser array 12, and each laser-exit region emits a laser beam of one color. In some embodiments, the laser-exit surface of the laser array 12 may include two laser-exit regions, three laser-exit regions, or four laser-exit regions, which are not limited in the present disclosure.

In some embodiments, as shown in FIG. 12A, the laser-exit surface of each laser array 12 includes a first laser-exit region 121, a second laser-exit region 122, and a third laser-exit region 123. In FIG. 12A, for convenience of distinction, each laser-exit region is separated by a dotted line. The first laser-exit region 121 is configured to emit a first color laser beam. The second laser-exit region 122 is configured to emit a second color laser beam. The third laser-exit region 123 is configured to emit a third color laser beam. The first color laser beam, the second color laser beam, and the third color laser beam are combined to form a white laser beam. Therefore, there is no need to provide a phosphor wheel in the laser source 100. In a case where one or more laser arrays included in a laser source can only produce laser beams of one or two colors, it is necessary to use the laser beams of the existing color to excite the phosphor wheel to generate fluorescence beams of other colors, so that the laser beams and the fluorescence beams together form white beams. As a result, in some embodiments of the present disclosure, the structure of the laser source 100 can be simplified, and the volume of the laser source 100 can be reduced.

The present disclosure does not limit the colors of the first color laser beam, the second color laser beam, and the third color laser beam, as long as the first color laser beam, the second color laser beam, and the third color laser beam can be mixed to form the white laser beam.

In some embodiments, as shown in FIG. 12A, the first color laser beam emitted by the first laser-exit region 121 is a blue laser beam, the second color laser beam exited by the second laser-exit region 122 is a green laser beam, and the third color laser beam exited by the third laser-exit region 123 is a red laser beam.

In some other embodiments, the first color laser beam emitted by the first laser-exit region 121 is a cyan laser beam, the second color laser beam emitted by the second laser-exit region 122 is a yellow laser beam, and the third color laser beam emitted by the third laser-exit region 123 is a magenta laser beam.

The first laser-exit region 121, the second laser-exit region 122, and the third laser-exit region 123 each may correspond to one lamp bead in the laser array 12, or may correspond to a row of lamp beads in the laser array 12, or may also correspond to multiple rows of lamp beads in the laser array 12, which is not limited in the present disclosure. In some embodiments, as shown in FIG. 12A, the first laser-exit region 121 and the second laser-exit region 122 each correspond to a row of lamp beads in the laser array 12, and the third laser-exit region 123 corresponds to two rows of lamp beads in the laser array 12. Each row of lamp beads includes six lamp beads.

In some embodiments, the beam path assembly 13 includes a plurality of combining lens groups 131. The number of the plurality of combining lens groups 131 is the same as the number of the plurality of laser arrays 12, and the plurality of combining lens groups 131 and the plurality of laser arrays 12 are in one-to-one correspondence. In a case where the laser source 100 includes only one laser array 12, the laser source 100 may include only one combining lens group.

Figure 15A:
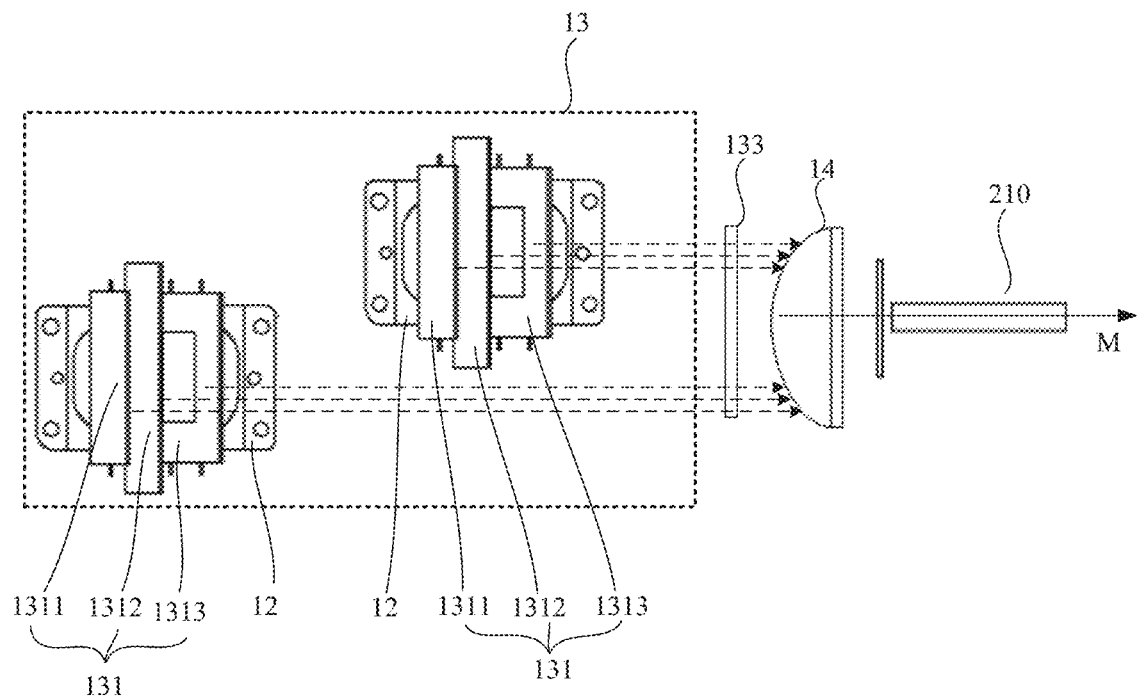
FIG. 15A is a diagram showing another beam path of a laser source, in accordance with some embodiments.
Figure 15B:
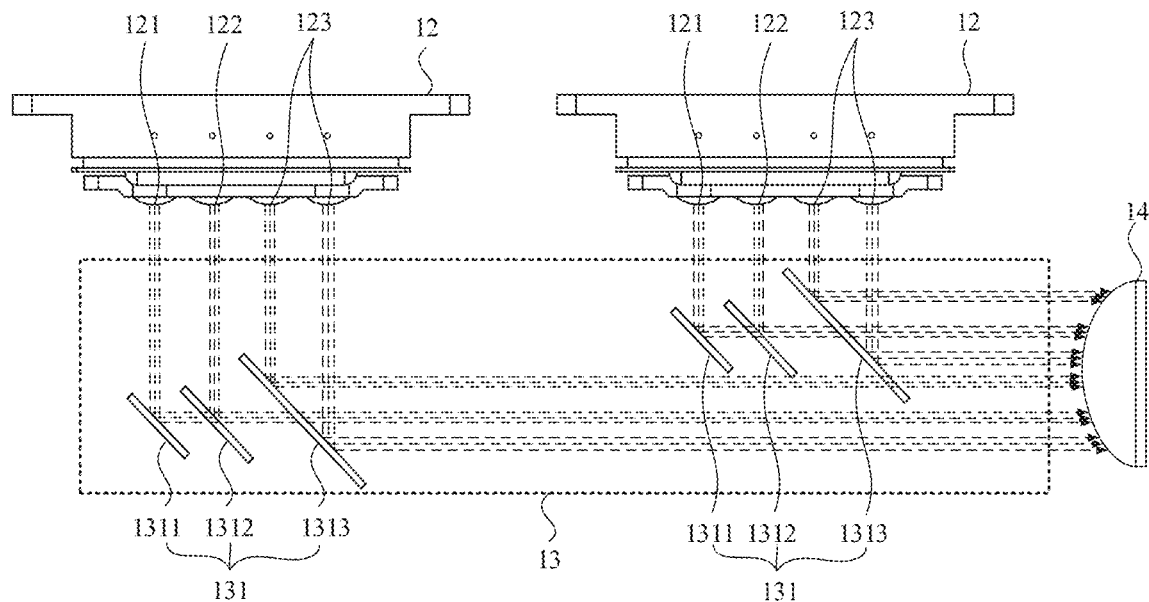
FIG. 15B is a schematic diagram from another angle of FIG. 15A.

As shown in FIGS. 11, 15A, and 15B, the beam path assembly 13 includes two combining lens groups 131. The two combining lens groups 131 and two laser arrays 12 are arranged in one-to-one correspondence. The two combining lens groups 131 are configured to combine laser beams of multiple colors of a corresponding laser array 12, and emit the laser beams exited from the two combining lens groups 131 toward the beam outlet 112. In this way, the laser beams of multiple colors emitted by each laser array 12 are combined through a corresponding combining lens group 131, so that a structure of the beam path assembly 13 is simple and the cost is low. Moreover, each combining lens group 131 may be proximate to the corresponding laser array 12, so that the laser beams emitted by the laser array 12 have a small beam spot when entering the combining lens group 131, so as to avoid a problem of a large size of the combining lens group 131 due to a large beam spot of the laser beams emitted by the laser array 12 when entering the combining lens group 131. As a result, the volume of the laser source 100 is made small, and the structure complexity is made low.

In order to enable a combining lens group 131 to combine the laser beams of multiple colors emitted by a corresponding laser array 12, and to make the combined laser beams to be emitted toward the beam outlet 112, in some embodiments, as shown in FIG. 11, the first laser-exit region 121, the second laser-exit region 122, and the third laser-exit region 123 are sequentially arranged in a direction perpendicular to an arrangement direction of the plurality of laser arrays 12 from an end away from the beam outlet 112 to an end proximate to the beam outlet 112; alternatively, as shown in FIGS. 15A and 15B, the first laser-exit region 121, the second laser-exit region 122, and the third laser-exit region 123 are sequentially arranged in an arrangement direction of the plurality of laser arrays 12 from an end away from the beam outlet 112 to an end proximate to the beam outlet 112 (i.e., they are arranged in a direction from left to right in FIG. 15B).

As shown in FIGS. 8 and 11, in a case where the first laser-exit region 121, the second laser-exit region 122, and the third laser-exit region 123 are sequentially arranged in the direction perpendicular to the arrangement direction of the plurality of laser arrays 12 from the end away from the beam outlet 112 to the end proximate to the beam outlet 112, an arrangement direction of the first laser-exit region 121, the second laser-exit region 122, and the third laser-exit region 123 may not coincide with the direction of the center line of the beam outlet 112 (i.e., the direction M of the illuminating beams), but may be perpendicular to the direction of the center line of the beam outlet 112.

In this case, after the combining lens group 131 combines the laser beams of multiple colors emitted by a corresponding laser array 12, the combined laser beams can exit from the beam outlet 112 after using a reflector 132 to change a propagation direction of the combined laser beams; alternatively, the reflector 132 is firstly used to change the propagation direction of the laser beams of multiple colors, and then the combining lens group 131 is used to combine the laser beams of multiple colors emitted by a corresponding laser array 12, so that the combined laser beams can exit from the beam outlet 112. The reflector 132 will be described later.

However, as shown in FIGS. 15A and 15B, in a case where the first laser-exit region 121, the second laser-exit region 122, and the third laser-exit region 123 are sequentially arranged in the arrangement direction of the plurality of laser arrays 12 from the end away from the beam outlet 112 to the end proximate to the beam outlet 112, the arrangement direction of the first laser-exit region 121, the second laser-exit region 122, and the third laser-exit region 123 coincides with the direction of the center line of the beam outlet 112 (i.e., the direction M of the illumination beams).

It can be seen therefrom that, the laser source 100 shown in FIG. 11 needs to use additional reflectors 132, but a dimension of the laser source 100 in the arrangement direction of the plurality of laser arrays 12 is small. Although a dimension of the laser source 100 shown in FIG. 15A in the arrangement direction of the plurality of laser arrays 12 is large, there is no need to use additional reflectors 132.

In some embodiments, the combining lens group 131 may include three combining lenses, but this is not to be understood as a limitation of the present disclosure.

In some embodiments, the first laser-exit region 121 is configured to emit the first color laser beam, the second laser-exit region 122 is configured to emit the second color laser beam, and the third laser-exit region 123 is configured to emit the third color laser beam. Each combining lens group 131 includes a first combining lens 1311, a second combining lens 1312, and a third combining lens 1313. The first combining lens 1311 reflects the first color laser beam. The second combining lens 1312 reflects the second color laser beam and transmits the first color laser beam reflected by the first combining lens 1311. The third combining lens 1313 reflects the third color laser beam, and transmits the first color laser beam reflected by the first combining lens 1311 and transmitted by the second combining lens 1312, and the second color laser beam reflected by the second combining lens 1312.

In some embodiments, as shown in FIG. 15B, the first combining lens 1311 is located at a laser-exit side of the first laser-exit region 121. The second combining lens 1312 is located at laser-exit sides of the second laser-exit region 122 and the first combining lens 1311. The third combining lens 1313 is located at laser-exit sides of the third combining lens 123, the first combining lens 1311 and the second combining lens 1312.

As shown in FIG. 15B, the first combining lens 1311, the second combining lens 1312, and the third combining lens 1313 of each combining lens group 131 are parallel to each other. In some embodiments, a reflection portion of the first combining lens 1311, a reflection portion of the second combining lens 1312, and a reflection portion of the third combining lens 1313 of each combining lens group 131 are parallel to each other.

Figure 13:
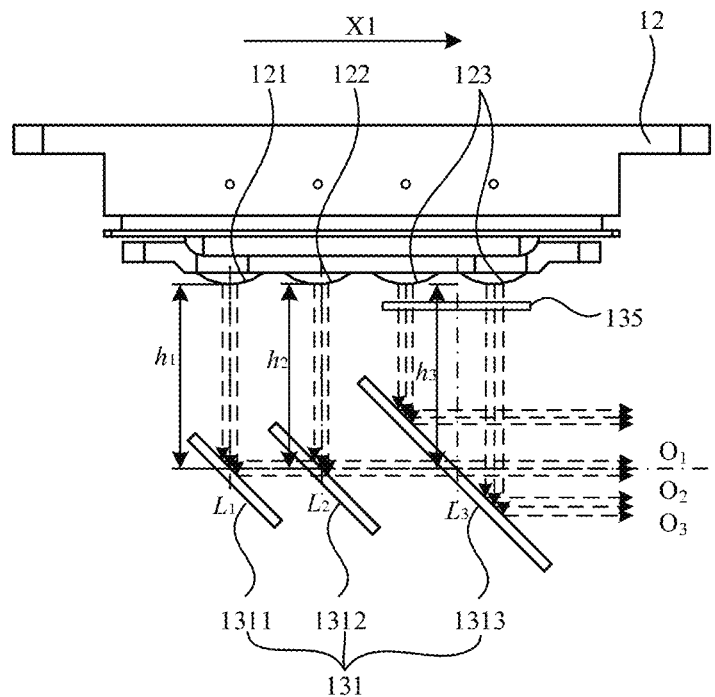
FIG. 13 is a diagram showing a structure of a laser source when a first wave plate is used, in accordance with some embodiments.

As shown in FIG. 13, an optical axis (e.g., the first optical axis $O_1$) of the first color laser beam reflected by the first combining lens 1311, an optical axis (e.g., the second optical axis $O_2$) of the second color laser beam reflected by the second combining lens 1312 and an optical axis (e.g., the third optical axis $O_3$) of the third color laser beam reflected by the third combining lens 1313 are approximately collinear. In this way, the laser beams of multiple colors emitted by the laser array 12 can be combined by the combining lens group 131. The first combining lens 1311, the second combining lens 1312, and the third combining lens 1313 constitute a combining lens group 131 combining laser beams of three colors emitted by the laser array 12. A structure of the combining lens group 131 is simple and easy to be implemented.

In the above embodiments, it can be understood that, it is difficult to ensure that the first optical axis $O_1$, the second optical axis $O_2$, and the third optical axis $O_3$ are absolutely collinear in the actual processing and installation of the laser source 100. Therefore, the "substantially collinear" of the first optical axis $O_1$, the second optical axis $O_2$ and the third optical axis $O_3$ described in some embodiments of the present disclosure will be understood as "collinear or approximately collinear".

In some embodiments, the first optical axis $O_1$, the second optical axis $O_2$ and the third optical axis $O_3$ are substantially collinear, meaning that any two optical axes of the first optical axis $O_1$, the second optical axis $O_2$, and the third optical axis $O_3$ satisfy one of the following conditions: 1) a distance between any two optical axes is less than a first pre-determined value, or 2) an included angle between any two optical axes is less than a second pre-determined value. The first pre-determined value may be within a range of 1 mm to 3 mm, such as 1 mm, 1.5 mm, 2 mm, 2.5 mm, or 3 mm. The second pre-determined value may be within a range of 1° to 3°, such as 1°, 1.5°, 2°, 2.5°, or 3°.

In some embodiments, the first combining lens 1311 may be a total reflection mirror or a dichroic lens, and the second combining lens 1312 and the third combining lens 1313 may be dichroic lenses.

Figure 16A:
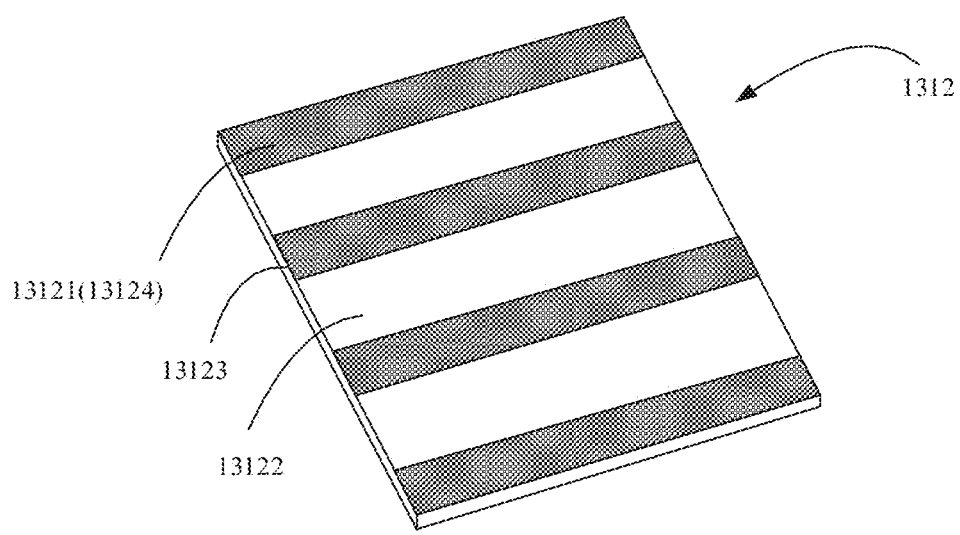
FIG. 16A is a diagram showing a structure of a combining lens in a laser source, in accordance with some embodiments.
Figure 16B:
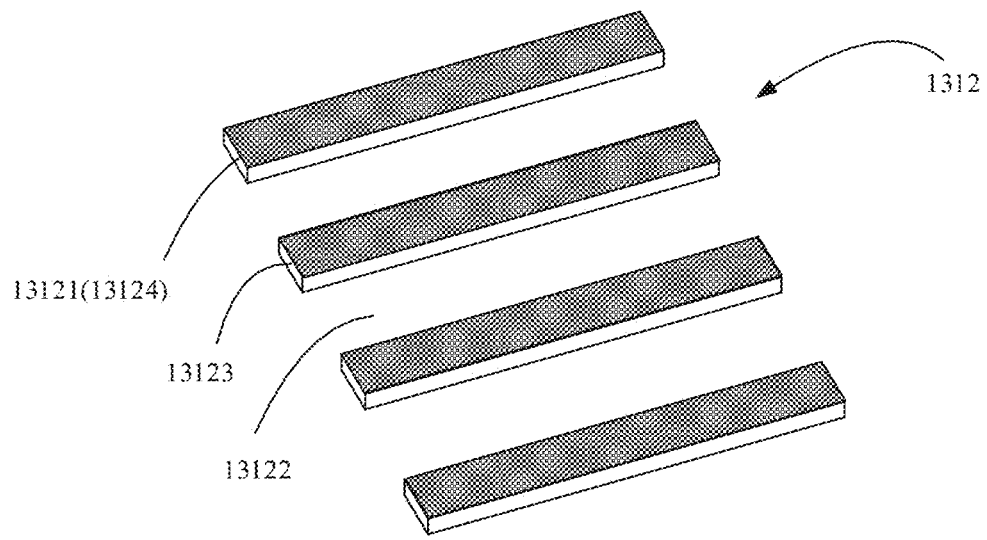
FIG. 16B is a diagram showing a structure of another combining lens in a laser source, in accordance with some embodiments.
Figure 17:
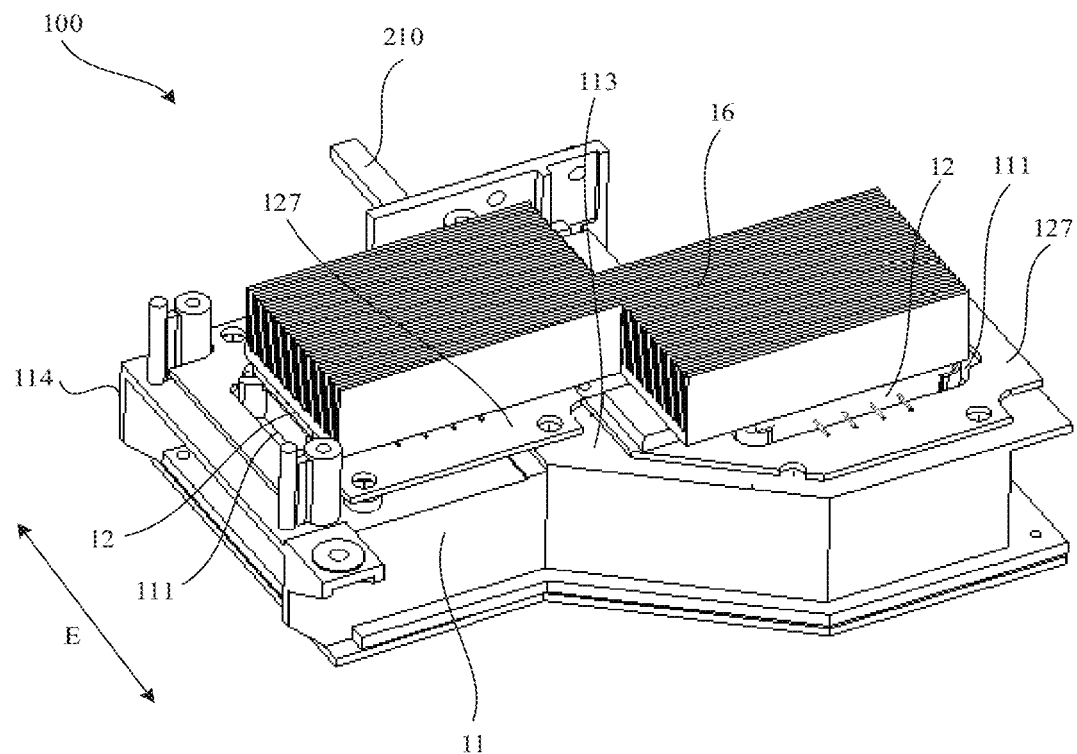
FIG. 17 is a perspective view of another laser source, in accordance with some embodiments.

In some embodiments, as shown in FIGS. 16A and 16B, the second combining lens 1312 includes a plurality of reflection portions 13121 and a plurality of transmission portions 13122. The plurality of reflection portions 13121 are arranged in a laser-exit path of the second laser-exit region 122, and are configured to reflect the second color laser beam. The plurality of transmission portions 13122 are arranged in a beam path of the first combining lens 1311 reflecting the first color laser beam, and are configured to transmit the first color laser beam. In some embodiments, the plurality of reflection portions 13121 and the plurality of transmission portions 13122 are alternately arranged. The number of the plurality of reflection portions 13121 is not limited, and it is set according to the number and the arrangement manner of the lamp beads in the second laser-exit region 122. The number of the plurality of transmission portions 13122 is not limited, and it is determined according to the number and the arrangement manner of the lamp beads in the first laser-exit region 121.

In some embodiments, the second combining lens 1312 may include only one reflection portion 13121 and one transmission portion 13122.

In some embodiments, the second combining lens 1312 includes a glass substrate 13123 and one or more strip-shaped reflection films 13124 plated on a surface of the glass substrate 13123 spaced apart from each other. The plurality of reflection portions 13121 correspond to portions of the second combining lens 1312 with the strip-shaped reflection films. In some examples, as shown in FIG. 16A, the plurality of transmission portions 13122 correspond to portions of the second combining lens 1312 without the strip-shaped reflection films. In some other examples, as shown in FIG. 16B, portions of the glass substrate 13123 that are not covered with the strip-shaped reflection films are removed to form hollowed-out portions. The plurality of transmission portions 13122 correspond to the hollowed-out portions.

In a case where the first combining lens 1311 is a dichroic lens, structures of the first combining lens 1311 and the third combining lens 1313 are similar to a structure of the second combining lens 1312, which will not be repeated herein.

Figure 14:
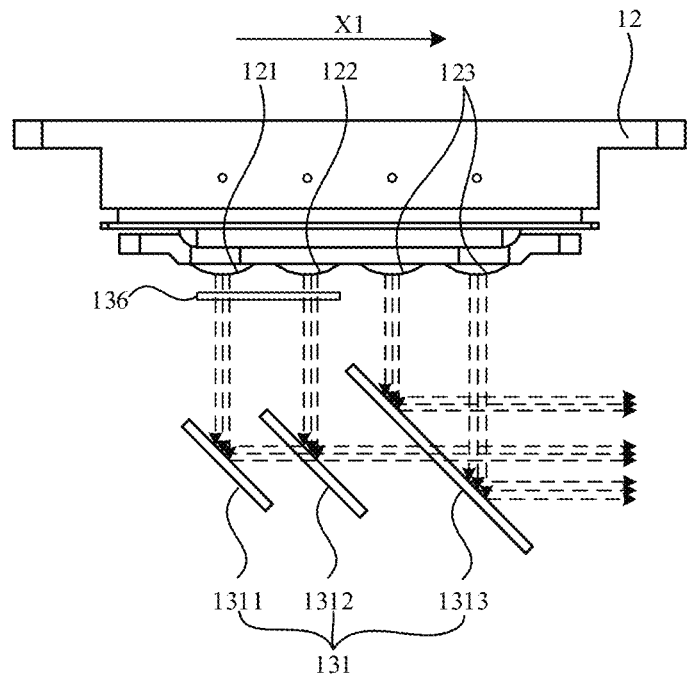
FIG. 14 is a diagram showing a structure of a laser source when a second wave plate and a third wave plate are used, in accordance with some embodiments.

In some embodiments, as shown in FIG. 13 or 14, an included angle between the reflection portion of the first combining lens 1311 of each combining lens group 131 and the laser-exit surface of the laser array 12 corresponding to the combining lens group 131, an included angle between the reflection portion of the second combining lens 1312 of each combining lens group 131 and the laser-exit surface of the laser array 12 corresponding to the combining lens group 131, and an included angle between the reflection portion of the third combining lens 1313 of each combining lens group 131 and the laser-exit surface of the laser array 12 corresponding to the combining lens group 131 are all within a range of 43° to 47° (i.e., 45°±2°). In this way, while the laser beams of three colors emitted by the laser array 12 are combined by the first combining lens 1311, the second combining lens 1312, and the third combining lens 1313, the laser beams of three colors emitted by the laser array 12 may also be turned by about 90°. As a result, a dimension of the laser source 100 in a direction perpendicular to the laser-exit surface of the laser array 12 (e.g., a dimension in an up and down direction in FIG. 13 or 14) can be reduced by a great degree, so as to achieve a purpose of reducing the volume of the laser source 100.

The direction perpendicular to the laser-exit surface of the laser array 12 refers to a thickness direction of the laser source 100 in FIG. 8, i.e., the $T_1$ direction. It is conceivable that, in FIG. 8, the laser-exit direction of the laser array 12 is $T_1$; the laser beams of three colors emitted by the laser array 12 are respectively reflected by the first combining lens 1311, the second combining lens 1312, and the third combining lens 1313, and then propagate toward the beam outlet 112 in the $T_2$ direction.

The reflection portion of the first combining lens 1311, the reflection portion of the second combining lens 1312 and the reflection portion of the third combining lens 1313 of each combining lens group 131 are all separated from the laser-exit surface of a corresponding laser array 12 by a predetermined distance. The predetermined distance is within a range of 1 mm to 6 mm.

In some embodiments, as shown in FIGS. 13 and 14, a distance between the reflection portion of the first combining lens 1311 and the first laser-exit region 121 in the central axis $L_1$ of the first laser-exit region 121 is the first distance $h_1$. A distance between the reflection portion of the second combining lens 1312 and the second laser-exit region 122 in the central axis $L_2$ of the second laser-exit region 122 is the second distance $h_2$. A distance between the reflection portion of the third combining lens 1313 and the third laser-exit region 123 in the central axis $L_3$ of the third laser-exit region 123 is the third distance $h_3$. The first distance $h_1$, the second distance $h_2$ and the third distance $h_3$ are all within a range of 1 mm to 6 mm, such as, 1 mm, 1.5 mm, 2 mm, 2.5 mm, 3 mm, 3.5 mm, 4 mm, 4.5 mm, 5 mm, 5.5 mm, or 6 mm.

In this way, a distance between the combining lens group 131 and a corresponding laser array 12 is moderate, which can reduce the dimension of the laser source 100 in the direction perpendicular to the laser-exit surface of the laser array 12; moreover, it may also be possible to avoid collision between the combining lens group 131 and the laser array 12 caused by a close distance between the combining lens group 131 and the laser array 12 during installation, which causes the combining lens group 131 or the laser array 12 to be damaged.

It will be noted that, as shown in FIG. 13, the central axis $L_1$ of the first laser-exit region 121 is an axis perpendicular to the laser-exit surface of the laser array 12 and passing through a center of the first laser-exit region 121. The central axis $L_2$ of the second laser-exit region 122 is an axis perpendicular to the laser-exit surface of the laser array 12 and passing through a center of the second laser-exit region 122. The central axis $L_3$ of the third laser-exit region 123 is an axis perpendicular to the laser-exit surface of the laser array 12 and passing through a center of the third laser-exit region 123.

In some embodiments, the beam path assembly 13 further includes a plurality of reflectors 132. The number of the plurality of reflectors 132 and the number of the plurality of combining lens groups 131 are equal. The plurality of reflectors 132 and the plurality of combining lens groups 131 are in one-to-one correspondence. Each reflector 132 is configured to change a propagation path of the laser beams exited from a corresponding combining lens group 131, so as to emit the laser beams exited from the combining lens group 131 toward the beam outlet 112.

In some embodiments, as shown in FIG. 11, the beam path assembly 13 includes two combining lens groups 131 and two reflectors 132. The two combining lens groups 131 and the two laser arrays 12 are in one-to-one correspondence. Each combining lens group 131 is configured to combine the laser beams of multiple colors emitted by the laser array 12 corresponding to the combining lens group 131. The two reflectors 132 and the two combining lens groups 131 are in one-to-one correspondence. Each reflector 132 is configured to change the propagation path of the laser beams exited from the combining lens group 131 corresponding to the reflector 132, so as to emit the laser beams exited from the combining lens group 131 toward the beam outlet 112. The beam path assembly with such structure has a simple structure and is easy to be implemented.

The arrangement direction of the first laser-exit region 121, the second laser-exit region 122, and the third laser-exit region 123 may be any direction parallel to the laser-exit surface of the laser array 12. As shown in FIG. 11, the arrangement direction of the first laser-exit region 121, the second laser-exit region 122, and the third laser-exit region 123 is perpendicular to the arrangement direction of the plurality of laser arrays 12. For example, the first laser-exit region 121, the second laser-exit region 122, and the third laser-exit region 123 of each laser array 12 may be arranged in an up and down direction in FIG. 11. The plurality of laser arrays 12 may be arranged in a left and right direction in FIG. 11.

In this way, a combining lens group 131 may emit laser beams in the direction perpendicular to the arrangement direction of the plurality of laser arrays 12. The reflector 132 corresponding to the combining lens group 131 is located in a laser-exit path of the combining lens group 131. An arrangement direction of the combining lens group 131 and the reflector 132 is perpendicular to the arrangement direction of the plurality of laser arrays 12, which is conducive to reducing the dimension of the laser source 100 in the arrangement direction of the plurality of laser arrays 12.

In order to avoid a large beam spot when the laser beams emitted by a laser array 12 propagate to the beam outlet 112 after passing through a corresponding combining lens group 131 and reflector 132, in some embodiments, as shown in FIG. 11, in two adjacent laser arrays 12, a beam-shaping lens 134 is provided between the beam outlet 112 and the reflector 132 corresponding to a laser array 12 that is farther from the beam outlet 112. The beam-shaping lens 134 is configured to reduce a divergence angle of the reflected laser beams of the reflector 132 before the reflected laser beams of the reflector 132 farther from the beam outlet 112 enter the beam outlet 112. As a result, a magnitude of a beam spot of the reflected laser beams is reduced when the reflected laser beams are transmitted to the beam outlet 112.

Compared with the green laser beam and the blue laser beam, the red laser beam has a large divergence angle, and the divergence angle of the red laser beam is classified into a divergence angle in a fast axis direction and a divergence angle in a slow axis direction. The divergence angle of the red laser beam in the fast axis direction is much larger than the divergence angle thereof in the slow axis direction. Therefore, in order to effectively avoid a large beam spot when the laser beams emitted by the laser array 12 propagate to the beam outlet 112 after passing through a corresponding combining lens group 131 and reflector 132, in some embodiments, the beam-shaping lens 134 is configured to reduce the divergence angles of the reflected laser beams in the fast axis direction of the red laser beam in the reflected laser beams before the reflected laser beams of the reflector 132 enter the beam outlet 112.

In order to improve uniformity of the laser beams exited from the plurality of combining lens groups 131 when they are combined into one laser beam, as shown in FIG. 11, a light homogenizing member 133 is provided at a beam inlet side of the beam outlet 112. In some embodiments, the light homogenizing member 133 may be a diffusion sheet, a fish-eye lens, or the like. As a result, the light homogenizing member 133 can improve uniformity of the laser beams exited from the plurality of combining lens groups 131 when they are combined into one laser beam.

In some embodiments, as shown in FIG. 10, a spherical lens 14 is installed in the beam outlet 112, and the spherical lens 14 can converge the laser beams entering the beam outlet 112. In this way, in a case where the laser source 100 is applied to the laser projection apparatus 10, sizes of optical elements (e.g., the light pipe 210 in FIG. 11) in the optical engine 200 receiving the illumination beams of the laser source 100 may be designed to be small, which is conducive to reducing the volume of the laser projection apparatus 10.

The laser beams emitted from the laser-exit surface of a laser array 12 is emitted by the lamp beads inside the laser array 12. Compared with the lamp beads that emit laser beams of other colors, a divergence angle of a laser beam emitted by the lamp bead that emits the red laser beam is large. On this basis, in order to avoid a large beam spot when the laser beams emitted by the laser array 12 propagate to the beam outlet 112 after passing through a corresponding combining lens group 131 and reflector 132, in some embodiments, as shown in FIG. 12A, the first color laser beam emitted by the first laser-exit region 121 is one of the blue laser beam and the green laser beam, the second color laser beam emitted by the second laser-exit region 122 is the other of the blue laser beam and the green laser beam, and the third color laser beam emitted by the third laser-exit region 123 is the red laser beam.

In this way, compared with the first color laser beam emitted by the first laser-exit region 121 and the second color laser beam emitted by the second laser-exit region 122, the third color laser beam (i.e., the red laser beam) emitted by the third laser-exit region 123 has a relatively short propagation path between the laser-exit surface of the laser array 12 and the beam outlet 112. Therefore, the red laser beam forms a small beam spot at the beam outlet 112, which can avoid a large beam spot when the laser beams emitted by the laser array 12 propagate to the beam outlet 112 after passing through a corresponding combining lens group 131 and reflector 132, and is conducive to reducing a diameter of the spherical lens 14 installed in the beam outlet 112.

The laser emitted by each lamp bead in a laser array 12 is linearly polarized light. Mode of resonant cavity oscillation in laser emission process of red lamp beads is different from modes of resonant cavity oscillation in blue lamp beads and green lamp beads, which causes that a polarization direction of a red linearly polarized light is 90 degrees different from a polarization direction of a blue linearly polarized light or a polarization direction of a green linearly polarized light. That is, the red laser beam is a P laser beam, and the blue laser beam and green laser beam are S laser beams. As a result, the polarization directions of the laser beams of three colors generated by the laser source 100 are different, and this may cause the projection image of the laser projection apparatus 10 using the laser source 100 to have a phenomenon of uneven chromaticity such as a "color spots" and a "color blocks".

Reasons for this phenomenon are that, on one hand, optical lenses (e.g., lenses, prisms) in the laser projection apparatus 10 have different transmittances for the P laser beam and the S laser beam, for example, a transmittance of the optical lens to the P laser beam is greater than a transmittance of the S laser beam; on the other hand, it is because a transmittance and a reflectivity of the screen itself for the laser beams having different polarization directions will be obviously different.

A function of a wave plate is to make two laser beams whose vibration directions are perpendicular to each other produce a phase difference. The wave plate mainly includes quarter-wave plates, half-wave plates and full-wave plates. The half-wave plate can change a polarization direction of a laser beam by 90 degrees.

In order to increase uniformity of the laser beams emitted by the laser source 100, in some embodiments, as shown in FIG. 13, a first wave plate 135 is provided between the third laser-exit region 123 and the third combining lens 1313. The first wave plate 135 is configured to rotate a polarization direction of the third color laser beam emitted by the third laser-exit region 123 by a range of 80° to 100° (i.e., 90°±10°). That is, the first wave plate 135 may be a half-wave plate. In this way, the polarization direction of the laser beam emitted from the third laser-exit region 123 may be changed through the first wave plate 135, so that the polarization direction of the laser beam emitted from the third laser-exit region 123 is kept consistent with a polarization direction of the laser beam emitted from the first laser-exit region 121 or the second laser-exit region 122, thereby improving uniformity of the laser beams emitted by the laser source 100.

In some other embodiments, as shown in FIG. 14, a second wave plate is provided between the first laser-exit region 121 and the first combining lens 1311, a third wave plate is provided between the second laser-exit region 122 and the second combining lens 1312. The second wave plate is configured to rotate the polarization direction of the first color laser beam emitted by the first laser-exit region 121 by a range of 80° to 100° (i.e., 90°±10°). The third wave plate is configured to rotate the polarization direction of the second color laser beam emitted by the second laser-exit region 122 by a range of 80° to 100° (i.e., 90°±10°). That is, both the second wave plate and the third wave plate may be half-wave plates. In this way, the polarization directions of the laser beams emitted by the first laser-exit region 121 and the second laser-exit region 122 are respectively changed through the second wave plate and the third wave plate, so that the polarization directions of the laser beams emitted by the first laser-exit region 121 and the second laser-exit region 122 are kept consistent with the polarization direction of the laser beam emitted by the third laser-exit region 123, thereby improving uniformity of the laser beams emitted by the laser source 100.

In some embodiments, as shown in FIG. 14, the second wave plate and the third wave plate may be formed as an integral member 136. In this way, the number of components included in the laser source 100 is small, and the structure complexity and assembly difficulty are low.

According to the laser source 100 in some embodiments of the present disclosure, the laser-exit surface of each laser array 12 includes a plurality of laser-exit regions. The plurality of laser-exit regions are configured to emit the laser beams of multiple colors. Therefore, there is no need to provide a large number of optical lenses in the laser source 100 in some embodiments of the present disclosure, thereby reducing the volume of the laser source 100 and reducing the structural complexity of the laser source 100.

It will be noted that, the arrangement positions of the plurality of laser arrays 12 on the side walls of the laser source housing 11 may have numerous variations. Correspondingly, the beam path assembly 13 may further include numerous variations.

In some embodiments, as shown in FIGS. 17 to 20, the plurality of laser arrays 12 are still disposed on a same side wall (e.g., the first side wall 113) of the laser source housing 11. However, unlike the plurality of laser arrays shown in FIG. 9 which are arranged in a direction perpendicular to the second side wall 114, in FIGS. 17 to 20, the plurality of laser arrays 12 are arranged in a direction approximately parallel to the second side wall 114. In this case, a dimension of the laser source 100 in the direction perpendicular to the second side wall 114 (i.e., the direction E in FIG. 17) is small. The direction perpendicular to the second side wall 114 is substantially parallel to the direction M of the illumination beams.

Figure 18:
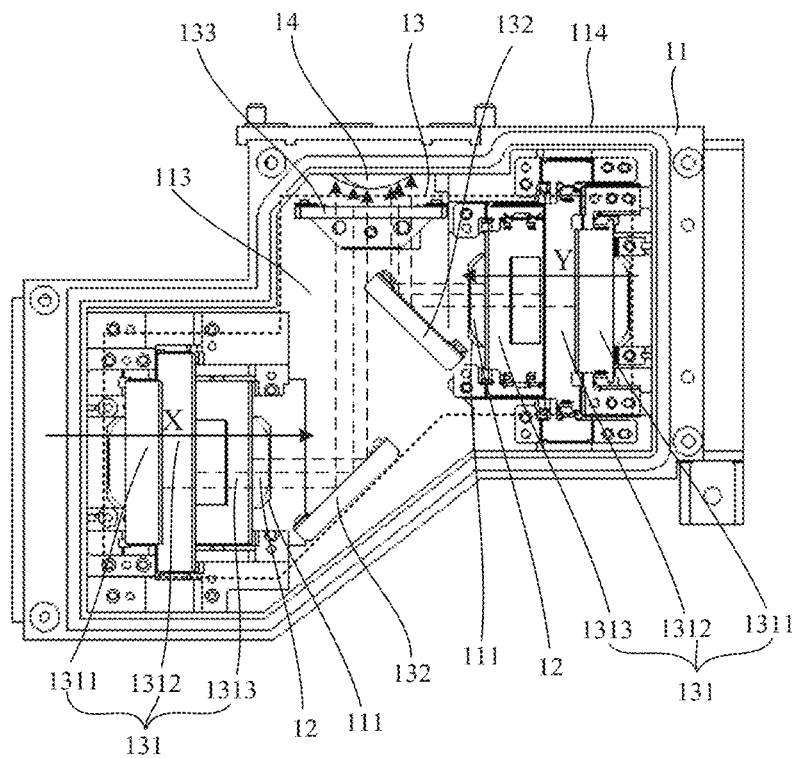
FIG. 18 is a diagram showing an internal structure of another laser source, in accordance with some embodiments.
Figure 19:
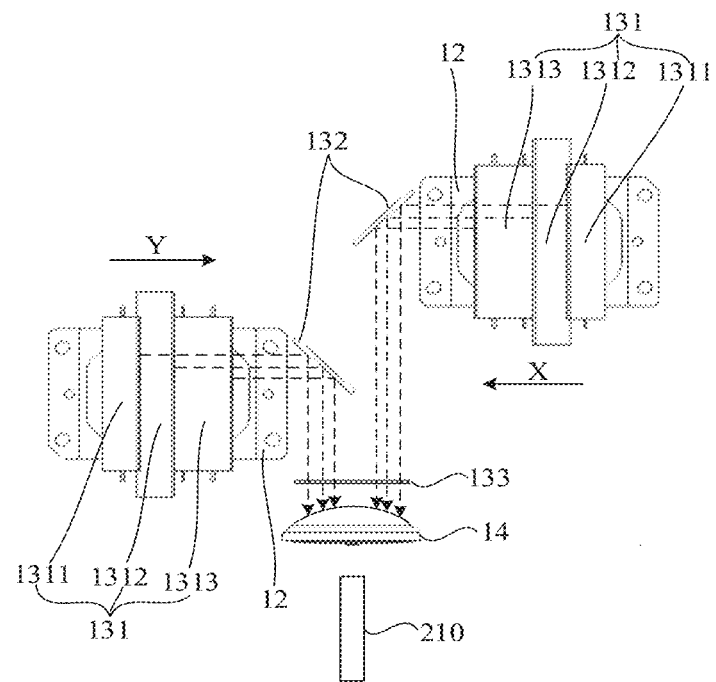
FIG. 19 is a diagram showing a beam path of another laser source, in accordance with some embodiments.
Figure 20:
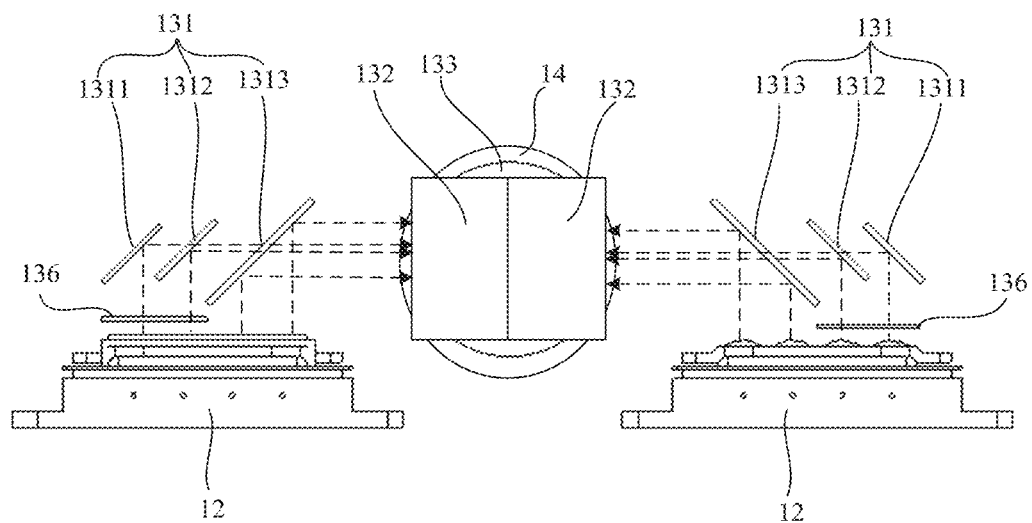
FIG. 20 is a diagram showing another beam path of another laser source, in accordance with some embodiments.

In some embodiments, referring to FIGS. 18 to 20, the beam path assembly 13 still includes two combining lens groups 131 and two reflectors 132. However, unlike the beam path assembly 13 shown in FIG. 11, in FIGS. 18 to 20, the laser-exit directions of the two combining lens groups 131 (i.e., the direction X and the direction Y in FIG. 18) are opposite. The beam path assembly with such structure has a simple structure and is easy to be implemented.

It will be noted that, the laser-exit directions of the two combining lens groups 131 are opposite, which means that the two combining lens groups 131 both emit laser beams to a region between the two combining lens groups 131, and the laser-exit directions of the two combining lens groups 131 are opposite. The two combining lens groups 131 may emit laser beams to a same position in the region between the two combining lens groups 131, or may emit laser beams to different positions in the region between the two combining lens groups 131. In some embodiments, as shown in FIGS. 18 and 19, the two combining lens groups 131 may emit laser beams to different positions in the region between the two combining lens groups 131.

In some embodiments, as shown in FIG. 12A, the first laser-exit region 121, the second laser-exit region 122, and the third laser-exit region 123 of each laser array 12 are all sequentially arranged (i.e., they are arranged in the X1 direction shown in FIG. 12A). In some embodiments, as shown in FIGS. 18 and 19, the first laser-exit regions 121, the second laser-exit regions 122, and the third laser-exit regions 123 of two laser arrays 12 are arranged in opposite directions. For example, a first laser-exit region 121, a second laser-exit region 122, and a third laser-exit region 123 of a laser array 12 located at a left side in FIG. 18 are sequentially arranged in the direction X. A first laser-exit region 121, a second laser-exit region 122, and a third laser-exit region 123 of a laser array 12 at a right side in FIG. 18 are sequentially arranged in the direction Y.

An arrangement manner of the plurality of laser arrays 12 on the laser source housing 11 shown in FIGS. 17 to 20 may make the laser source housing 11 have an irregular shape, which may be adapted to a situation that installation space reserved for the laser source 100 in the laser projection apparatus 10 is narrow or irregular. This improves flexibility of an outer contour or an installation position of the laser source 100.

In some embodiments, as shown in FIGS. 21 to 25B, the plurality of laser arrays 12 are disposed on two opposite side walls (e.g., a first side wall 113 and a third side wall 115) of the laser source housing 11. A second side wall 114 is located between the first side wall 113 and the third side wall 115, and is perpendicular to both the first side wall 113 and the third side wall 115.

Figure 21:
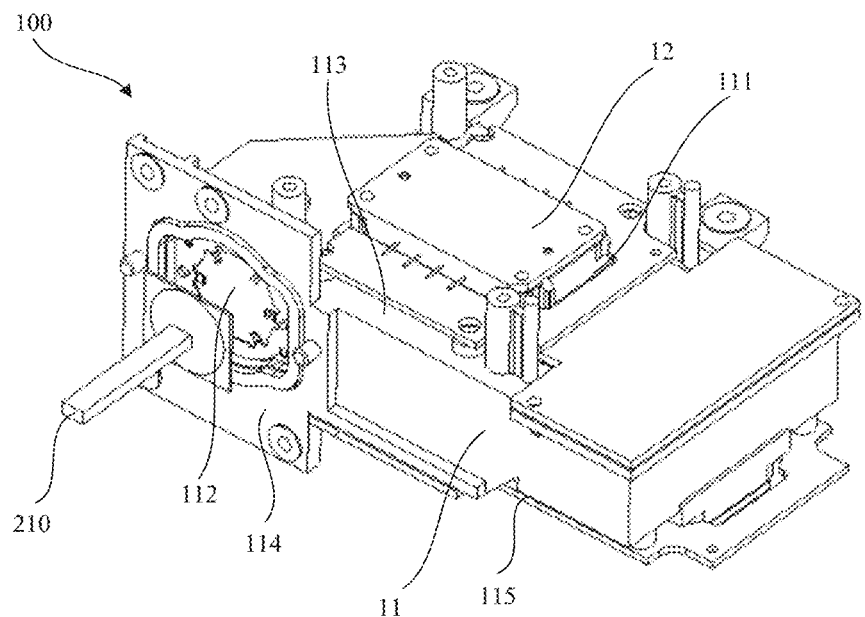
FIG. 21 is a perspective view of yet another laser source, in accordance with some embodiments.
Figure 22:
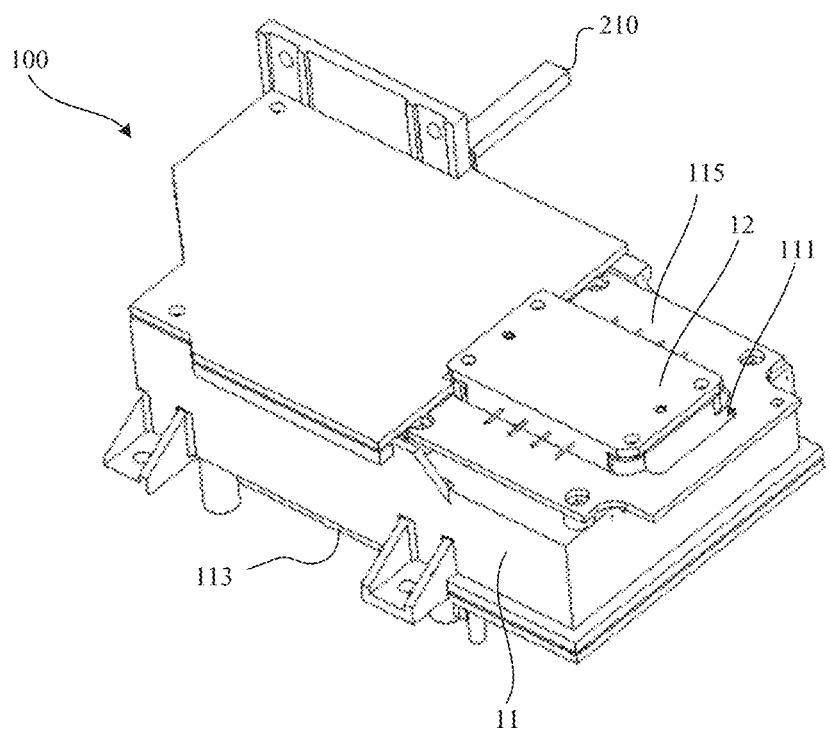
FIG. 22 is a perspective view of the laser source in FIG. 21 after being turned over.

In some embodiments, referring to FIGS. 21 and 22, FIG. 22 shows a back surface of the laser source 100 in FIG. 21. The first side wall 113 and the third side wall 115 may be oppositely arranged in a thickness direction of the laser source housing 11. The first side wall 113 and the third side wall 115 may be parallel, and the first side wall 113 and the third side wall 115 each include an accommodating opening 111. The second side wall 114 includes a beam outlet 112.

Figure 23:
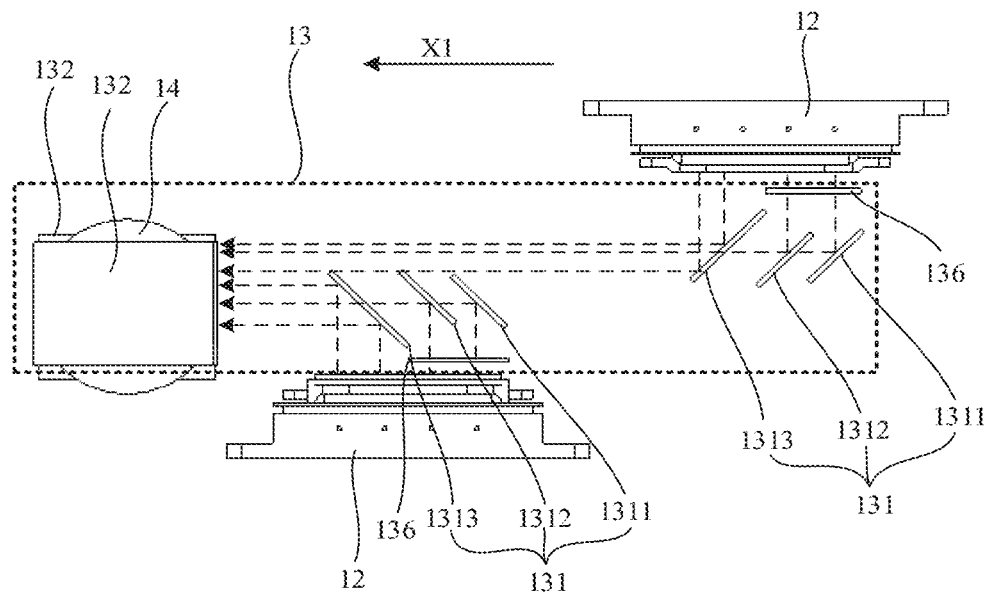
FIG. 23 is a diagram showing a beam path of yet another laser source, in accordance with some embodiments.
Figure 24:
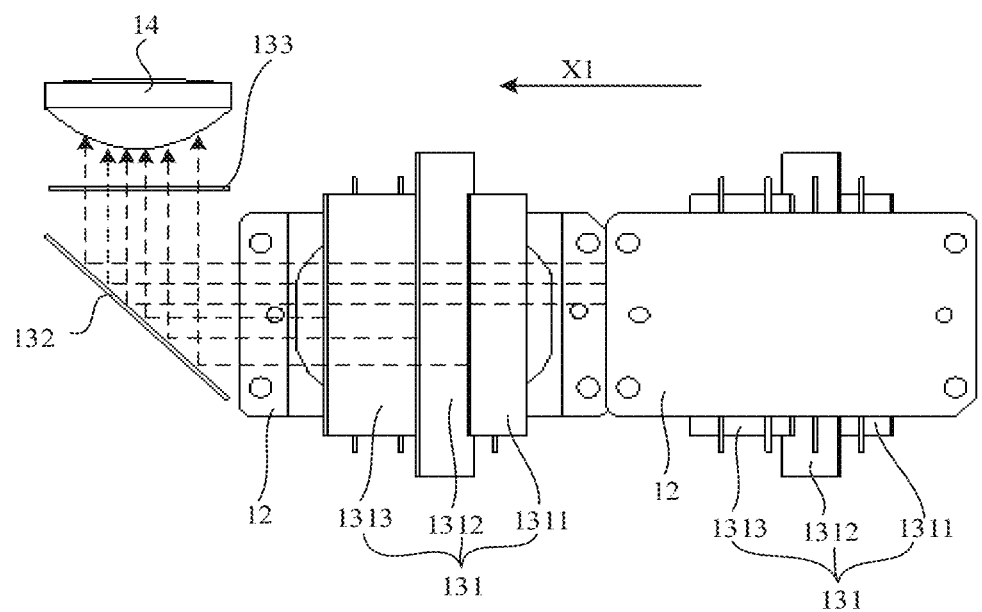
FIG. 24 is a diagram showing another beam path of yet another laser source, in accordance with some embodiments.

In some embodiments, as shown in FIGS. 23 and 24, the beam path assembly 13 still includes two combining lens groups 131 and two reflectors 132, and the two combining lens groups 131 each emits laser beams toward a corresponding reflector 132. The two reflectors 132 are respectively configured to change the propagation paths of the laser beams emitted by the two combining lens groups 131, so as to make the laser beams exited from the two combining lens groups 131 exit from the beam outlet 112. In this way, the beam path assembly 13 has a simple structure and the low cost. The laser source 100 has a small volume and low structure complexity, and is easy to be implemented.

In some embodiments, as shown in FIG. 23, the first laser-exit region 121, the second laser-exit region 122, and the third laser-exit region 123 of each laser array 12 are sequentially arranged in a direction proximate to the reflectors 132 (i.e., the direction X1 in FIGS. 23 and 24).

Figure 25A:
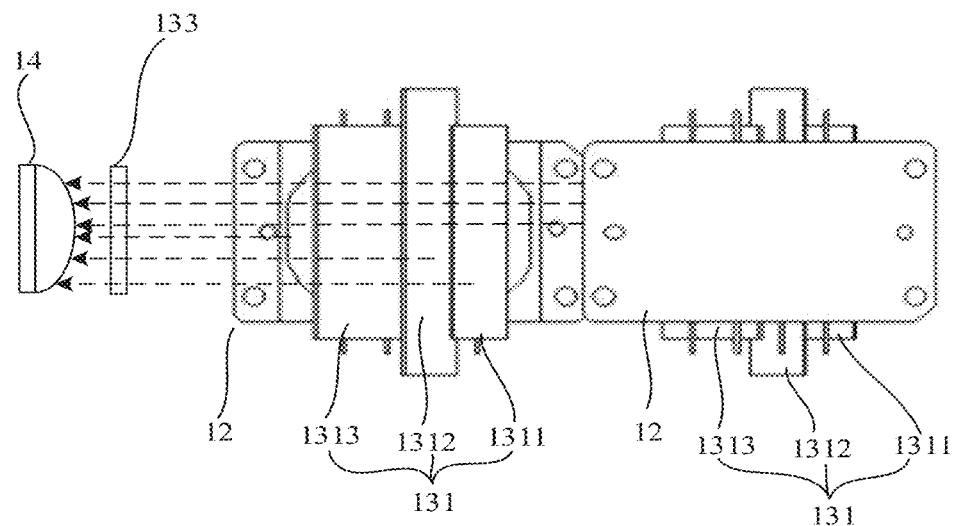
FIG. 25A is a diagram showing yet another beam path of yet another laser source, in accordance with some embodiments.
Figure 25B:
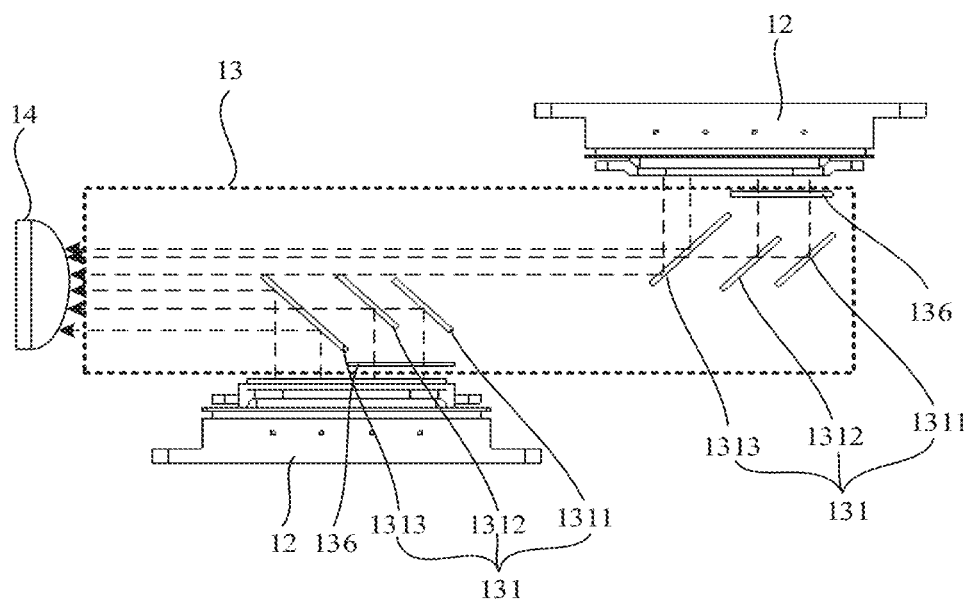
FIG. 25B is a schematic diagram from another angle of FIG. 25A.

In some embodiments, as shown in FIGS. 25A and 25B, the beam path assembly 13 still includes two combining lens groups 131. Unlike the two combining lens groups 131 shown in FIGS. 15A and 15B located at a same side of a corresponding laser array 12, the two combining lens groups 131 in FIGS. 25A and 25B are located at different sides of a corresponding laser array 12. For example, a combining lens group 131 corresponding to a laser array 12 at a left side in FIG. 25B is located at an upper side of the laser array 12, and a combining lens group 131 corresponding to a laser array 12 at a right side in FIG. 25B is located at a lower side of the laser array 12. The two combining lens groups 131 are located between the two laser arrays 12 in an up and down direction.

The foregoing descriptions are merely specific implementation manners of the present disclosure, but the protection scope of the present disclosure is not limited thereto. Any person skilled in the art could conceive of changes or replacements within the technical scope of the present disclosure, which shall be included in the protection scope of the present disclosure. Therefore, the scope of the present disclosure shall be subject to the protection scope of the claims.

Those skilled in the art will understand that the scope of disclosure involved in the present disclosure is not limited to the technical solutions formed by the specific combinations of the above technical features, and will also cover other technical solutions formed by any combination of the above technical features or their equivalent features without departing from the disclosed concept. For example, a technical solution formed by replacing the above features with technical features disclosed in some embodiments (but not limited to) having similar functions.

What is claimed is:

1. A laser source, comprising:
   a laser source housing, the laser source housing including a plurality of accommodating openings and a beam outlet, the plurality of accommodating openings being disposed at a same side wall or different side walls of the laser source housing;
   a plurality of laser arrays, the plurality of laser arrays being respectively disposed in the plurality of accommodating openings, and each laser array of the plurality of laser arrays being configured to emit laser beams into the laser source housing, and a laser-exit surface of the laser array including a plurality of laser-exit regions, and the plurality of laser-exit regions being configured to emit laser beams of multiple colors; and
   a beam path assembly, the beam path assembly being disposed inside the laser source housing, and the beam path assembly being configured to combine the laser beams of the multiple colors emitted by the laser array, and make combined laser beams exit toward the beam outlet.

2. The laser source according to claim 1, wherein the laser source housing includes a first side wall and a second side wall that are perpendicular to each other, the first side wall includes the plurality of accommodating openings, and the second side wall includes the beam outlet.

3. The laser source according to claim 2, wherein
   the plurality of accommodating openings are arranged in a direction perpendicular to the second side wall; or
   the plurality of accommodating openings are arranged in a direction substantially parallel to the second side wall.

4. The laser source according to claim 2, wherein the first side wall includes two accommodating openings, and two laser arrays are respectively disposed in the two accommodating openings.

5. The laser source according to claim 1, wherein
   the laser source housing includes a first side wall and a third side wall that are opposite to each other, and a second side wall perpendicular to the first side wall and the third side wall;
   the first side wall and the third side wall each includes at least one accommodating opening, and the second side wall includes the beam outlet; and
   a part of the plurality of laser arrays are disposed in the at least one accommodating opening of the first side wall, and another part of the plurality of laser arrays are disposed in the at least one accommodating opening of the third side wall.

6. The laser source according to claim 1, wherein the plurality of laser-exit regions includes:
   a first laser-exit region being configured to emit a first color laser beam;
   a second laser-exit region being configured to emit a second color laser beam; and
   a third laser-exit region being configured to emit a third color laser beam; wherein
   the first color laser beam, the second color laser beam, and the third color laser beam are combined to form a white laser beam.

7. The laser source according to claim 6, wherein
   the first laser-exit region, the second laser-exit region, and the third laser-exit region are sequentially arranged from an end of the laser source housing far away from the beam outlet to an end of the laser source housing proximate to the beam outlet;
   the beam path assembly includes:
      a plurality of combining lens groups, the plurality of combining lens groups and the plurality of laser arrays being in one-to-one correspondence, each combining lens group being located at a same side or different sides of the plurality of laser arrays, and the combining lens group being configured to combine the laser beams of the multiple colors emitted by a corresponding laser array.

8. The laser source according to claim 7, wherein
   the beam path assembly further includes a plurality of reflectors, the plurality of reflectors and the plurality of combining lens groups are in one-to-one correspondence, each of the plurality of reflectors is configured to change a propagation path of laser beams emitted by a corresponding combining lens group, so as to make the laser beams exited from the corresponding combining lens group exit toward the beam outlet, wherein
   the plurality of combining lens groups include two combining lens groups, and the plurality of reflectors include two reflectors;
   laser-exit directions of the two combining lens groups are same, arrangement directions of first laser-exit regions, second laser-exit regions, and third laser-exit regions of two laser arrays are same; or, laser-exit directions of the two combining lens groups are opposite, and arrangement directions of first laser-exit regions, second laser-exit regions, and third laser-exit regions of two laser arrays are opposite; and
   a first laser-exit region, a second laser-exit region, and a third laser-exit region of each of the two laser arrays are sequentially arranged in a direction from an end of the laser source housing away from a corresponding reflector to an end of the laser source housing proximate to the corresponding reflector.

9. The laser source according to claim 7, further comprising at least one of the following:
a spherical lens located in the beam outlet, the spherical lens being configured to converge laser beams entering the beam outlet; or
a light homogenizing member located at a beam inlet side of the beam outlet.

10. The laser source according to claim 6, wherein
the beam path assembly includes a combining lens group corresponding to the laser array, and the combining lens group is configured to combine the laser beams of the multiple colors emitted by the laser array; and
the combining lens group includes:
a first combining lens located at a laser-exit side of the first laser-exit region, to reflect the first color laser beam emitted by the first laser-exit region;
a second combining lens located at a laser-exit side of the second laser-exit region, to reflect the second color laser beam emitted by the second laser-exit region; and
a third combining lens located at laser-exit sides of the third laser-exit region, the first combining lens and the second combining lens, to reflect the third color laser beam emitted by the third laser-exit region, to transmit the first color laser beam reflected by the first combining lens, and to transmit the second color laser beam reflected by the second combining lens.

11. The laser source according to claim 10, wherein
an optical axis of the first color laser beam reflected by the first combining lens, an optical axis of the second color laser beam reflected by the second combining lens and an optical axis of the third color laser beam reflected by the third combining lens are substantially collinear; and/or
the first color laser beam emitted by the first laser-exit region is one of a blue laser beam and a green laser beam, the second color laser beam emitted by the second laser-exit region is another one of the blue laser beam and the green laser beam, and the third color laser beam emitted by the third laser-exit region is a red laser beam.

12. The laser source according to claim 10, wherein
an included angle between a reflection portion of the first combining lens and the laser-exit surface of the laser array corresponding to the combining lens group, an included angle between a reflection portion of the second combining lens and the laser-exit surface of the laser array corresponding to the combining lens group, and an included angle between a reflection portion of the third combining lens and the laser-exit surface of the laser array corresponding to the combining lens group are all within a range of 43° to 47° (45°±2°); and/or
a reflection portion of the first combining lens, a reflection portion of the second combining lens, and a reflection portion of the third combining lens are each separated from a laser-exit surface of a corresponding laser array by a predetermined distance.

13. The laser source according to claim 10, wherein a polarization direction of the first color laser beam emitted by the first laser-exit region is same as a polarization direction of the second color laser beam emitted by the second laser-exit region, and the polarization direction of the second color laser beam emitted by the second laser-exit region is perpendicular to a polarization direction of the third color laser beam emitted by the third laser-exit region;
the laser source comprises a first wave plate; and
the first wave plate is located between the third laser-exit region and the third combining lens, and the first wave plate is configured to rotate the polarization direction of the third color laser beam emitted by the third laser-exit region by a range of 80° to 100° (90°±10°).

14. A laser projection apparatus, comprising:
a laser source being configured to provide illumination beams, and the laser source being the laser source according to claim 1;
an optical engine being configured to modulate the illumination beams with image display signals to obtain projection beams; and
a projection lens being configured to project the projection beams on a screen or a wall for imaging.

15. A laser source, comprising:
a laser source housing, the laser source housing including an accommodating opening and a beam outlet;
a laser array, the laser array being disposed in the accommodating opening, and the laser array being configured to emit laser beams into the laser source housing, and a laser-exit surface of the laser array including a plurality of laser-exit regions, and the plurality of laser-exit regions being configured to emit laser beams of multiple colors; and
a beam path assembly, the beam path assembly being disposed inside the laser source housing, and the beam path assembly being configured to combine the laser beams of the multiple colors emitted by the laser array, and make combined laser beams exit toward the beam outlet, wherein
the plurality of laser-exit regions includes:
a first laser-exit region being configured to emit a first color laser beam;
a second laser-exit region being configured to emit a second color laser beam; and
a third laser-exit region being configured to emit a third color laser beam, wherein
the first color laser beam, the second color laser beam, and the third color laser beam are combined to form a white laser beam;
the first laser-exit region, the second laser-exit region, and the third laser-exit region are sequentially arranged from an end of the laser source housing far away from the beam outlet to an end of the laser source housing proximate to the beam outlet; and
the beam path assembly includes a combining lens group corresponding to the laser array, and the combining lens group is configured to combine the laser beams of the multiple colors emitted by the laser array.

16. The laser source according to claim 15, wherein the combining lens group includes:
a first combining lens located at a laser-exit side of the first laser-exit region, to reflect the first color laser beam emitted by the first laser-exit region;
a second combining lens located at laser-exit sides of the second laser-exit region and the first combining lens, to reflect the second color laser beam emitted by the second laser-exit region, and to transmit the first color laser beam reflected by the first combining lens; and
a third combining lens located at laser-exit sides of the third laser-exit region, the first combining lens and the second combining lens, to reflect the third color laser beam emitted by the third laser-exit region, to transmit the first color laser beam reflected by the first combining lens and transmitted by the second combining lens, and to transmit the second color laser beam reflected by the second combining lens; and a reflection portion of the first combining lens, a reflection portion of the second combining lens, and a reflection portion of the third combining lens being parallel to each other.

17. The laser source according to claim 16, wherein an optical axis of the first color laser beam reflected by the first combining lens, an optical axis of the second color laser beam reflected by the second combining lens and an optical axis of the third color laser beam reflected by the third combining lens are substantially collinear.

18. The laser source according to claim 16, wherein an included angle between the reflection portion of the first combining lens and the laser-exit surface of the laser array corresponding to the combining lens group, an included angle between the reflection portion of the second combining lens and the laser-exit surface of the laser array corresponding to the combining lens group, and an included angle between the reflection portion of the third combining lens and the laser-exit surface of the laser array corresponding to the combining lens group are all within a range of 43° to 47° (45°±2°); and/or the reflection portion of the first combining lens, the reflection portion of the second combining lens, and the reflection portion of the third combining lens are each separated from a laser-exit surface of a corresponding laser array by a predetermined distance.

19. The laser source according to claim 16, wherein the first color laser beam emitted by the first laser-exit region is one of a blue laser beam and a green laser beam, the second color laser beam emitted by the second laser-exit region is another one of the blue laser beam and the green laser beam, and the third color laser beam emitted by the third laser-exit region is a red laser beam.

20. The laser source according to claim 16, wherein a polarization direction of the first color laser beam emitted by the first laser-exit region is same as a polarization direction of the second color laser beam emitted by the second laser-exit region, and the polarization direction of the second color laser beam emitted by the second laser-exit region is perpendicular to a polarization direction of the third color laser beam emitted by the third laser-exit region;

the laser source comprises a first wave plate; or, the laser source comprises a second wave plate and a third wave plate;

the first wave plate is located between the third laser-exit region and the third combining lens, and the first wave plate is configured to rotate the polarization direction of the third color laser beam emitted by the third laser-exit region by a range of 80° to 100° (90°±10°); and the second wave plate is located between the first laser-exit region and the first combining lens, the third wave plate is located between the second laser-exit region and the second combining lens, the second wave plate is configured to rotate the polarization direction of the first color laser beam emitted by the first laser-exit region by a range of 80° to 100° (90°±10°), and the third wave plate is configured to rotate the polarization direction of the second color laser beam emitted by the second laser-exit region by a range of 80° to 100° (90°±10°).

* * * * *